United States Patent
Margulis

(10) Patent No.: US 9,781,473 B2
(45) Date of Patent: *Oct. 3, 2017

(54) METHOD FOR EFFECTIVELY IMPLEMENTING A MULTI-ROOM TELEVISION SYSTEM

(71) Applicant: ECHOSTAR TECHNOLOGIES L.L.C., Englewood, CO (US)

(72) Inventor: Neal Margulis, Woodside, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,483

(22) Filed: Aug. 30, 2016

(65) Prior Publication Data
US 2017/0019704 A1   Jan. 19, 2017

Related U.S. Application Data

(63) Continuation of application No. 13/609,033, filed on Sep. 10, 2012, now Pat. No. 9,491,523, which is a (Continued)

(51) Int. Cl.
*H04N 7/18* (2006.01)
*H04N 21/436* (2011.01)
(Continued)

(52) U.S. Cl.
CPC ... *H04N 21/43615* (2013.01); *H04L 12/2838* (2013.01); *H04L 29/06027* (2013.01);
(Continued)

(58) Field of Classification Search
USPC .................................. 725/79–82, 85, 120
See application file for complete search history.

(56) References Cited

U.S. PATENT DOCUMENTS

| 3,416,043 A | 12/1968 | Jorgensen |
| 4,254,303 A | 3/1981 | Takizawa |

(Continued)

FOREIGN PATENT DOCUMENTS

| CN | 1464685 | 12/2003 |
| DE | 4407319 A1 | 9/1994 |

(Continued)

OTHER PUBLICATIONS

US 7,917,923, 03/2011, Babu (withdrawn)
(Continued)

*Primary Examiner* — Gigi L Dubasky
(74) *Attorney, Agent, or Firm* — LK Global

(57) ABSTRACT

A method for effectively implementing a multi-room television system includes a digital base station that processes and combines various program sources to produce a processed stream. A communications processor then responsively transmits the processed stream as a local composite output stream to various wired and wireless display devices for flexible viewing at variable remote locations. The transmission path performance is used to determine the video encoding process, and special attention is taken to assure that all users have low-latency interactive capabilities.

19 Claims, 9 Drawing Sheets

Related U.S. Application Data continuation of application No. 11/111,265, filed on Apr. 21, 2005, now Pat. No. 8,266,657, which is a continuation-in-part of application No. 09/809,868, filed on Mar. 15, 2001, now Pat. No. 7,725,912, which is a continuation of application No. 09/318,904, filed on May 26, 1999, now Pat. No. 6,263,503.

(51) Int. Cl.

| | | |
|---|---|---|
| *H04L 12/28* | (2006.01) | |
| *H04L 29/06* | (2006.01) | |
| *H04N 7/10* | (2006.01) | |
| *H04N 21/4363* | (2011.01) | |
| *H04N 21/4402* | (2011.01) | |
| *H04N 21/442* | (2011.01) | |
| *H04N 21/462* | (2011.01) | |
| *H04N 21/84* | (2011.01) | |
| *H04N 5/38* | (2006.01) | |
| *H04N 5/44* | (2011.01) | |
| *H04L 1/00* | (2006.01) | |
| *H04W 84/12* | (2009.01) | |

(52) U.S. Cl.
 CPC ........... *H04L 65/602* (2013.01); *H04N 7/106* (2013.01); *H04N 21/43632* (2013.01); *H04N 21/43637* (2013.01); *H04N 21/440218* (2013.01); *H04N 21/44227* (2013.01); *H04N 21/440227* (2013.01); *H04N 21/4621* (2013.01); *H04N 21/4622* (2013.01); *H04N 21/84* (2013.01); *H04L 1/0041* (2013.01); *H04L 2012/2849* (2013.01); *H04N 5/38* (2013.01); *H04N 5/4401* (2013.01); *H04N 2005/4433* (2013.01); *H04W 84/12* (2013.01)

(56) References Cited

U.S. PATENT DOCUMENTS

| | | |
|---|---|---|
| 5,132,992 A | 7/1992 | Yurt et al. |
| 5,159,447 A | 10/1992 | Haskell et al. |
| 5,161,021 A | 11/1992 | Tsai |
| 5,237,420 A | 8/1993 | Hayashi |
| 5,237,648 A | 8/1993 | Mills et al. |
| 5,293,357 A | 3/1994 | Hallenbeck |
| 5,321,846 A | 6/1994 | Yokota et al. |
| 5,377,332 A | 12/1994 | Entwistle et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,537,530 A | 7/1996 | Edgar et al. |
| 5,541,852 A | 7/1996 | Eyuboglu et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,870,144 A | 2/1999 | Guerrera |
| 5,880,721 A | 3/1999 | Yen |
| 5,889,506 A | 3/1999 | Lopresti et al. |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,969,764 A | 10/1999 | Sun et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,023,233 A | 2/2000 | Craven et al. |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,044,396 A | 3/2000 | Adams |
| 6,049,671 A | 4/2000 | Slivka et al. |
| 6,067,118 A | 5/2000 | Chen et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,157,674 A | 12/2000 | Oda et al. |
| 6,160,544 A | 12/2000 | Hayashi et al. |
| 6,161,132 A | 12/2000 | Roberts et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,497 B1 | 6/2001 | Chiang et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,289,485 B1 | 9/2001 | Shiomoto |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,359,902 B1 | 3/2002 | Putzolu |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,456,781 B1 | 9/2002 | Rijckaert |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,160 B1 | 1/2003 | Levy et al. |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |

(56) References Cited

U.S. PATENT DOCUMENTS

| | | | |
|---|---|---|---|
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,668,261 B1 | 12/2003 | Trucco et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,277 B1 | 6/2004 | Shaffer et al. |
| 6,757,851 B1 | 6/2004 | Park et al. |
| 6,757,906 B1 | 6/2004 | Look et al. |
| 6,766,376 B2 | 7/2004 | Price |
| 6,766,523 B2 | 7/2004 | Herley |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,788,882 B1 | 9/2004 | Geer et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,910,175 B2 | 6/2005 | Krishnamachari |
| 6,927,685 B2 | 8/2005 | Wathen |
| 6,930,661 B2 | 8/2005 | Uchida et al. |
| 6,931,067 B2 | 8/2005 | Jang |
| 6,941,575 B2 | 9/2005 | Allen |
| 6,944,880 B1 | 9/2005 | Allen |
| 6,952,595 B2 | 10/2005 | Ikedo et al. |
| 6,970,602 B1 | 11/2005 | Smith et al. |
| 6,981,050 B1 | 12/2005 | Tobias et al. |
| 6,985,932 B1 | 1/2006 | Glaser et al. |
| 6,993,689 B2 | 1/2006 | Nagai et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,103,905 B2 | 9/2006 | Novak |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,317,759 B1 * | 1/2008 | Turaga | H04N 19/147 375/240.01 |
| 7,344,084 B2 | 3/2008 | DaCosta |
| 7,404,200 B1 | 7/2008 | Hailey et al. |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,502,818 B2 | 3/2009 | Kohno et al. |
| 7,505,480 B1 | 3/2009 | Zhang et al. |
| 7,565,681 B2 | 7/2009 | Ngo et al. |
| 7,577,978 B1 | 8/2009 | Wistendahl et al. |
| 7,583,676 B2 | 9/2009 | Shobatake |
| 7,616,955 B2 * | 11/2009 | Kim | H04B 7/0626 455/41.2 |
| 7,647,614 B2 | 1/2010 | Krikorian et al. |
| 7,676,823 B2 | 3/2010 | Acharya et al. |
| 7,702,952 B2 | 4/2010 | Tarra et al. |
| 7,707,614 B2 | 4/2010 | Krikorian et al. |
| 7,720,432 B1 | 5/2010 | Colby et al. |
| 7,725,912 B2 | 5/2010 | Margulis |
| 7,769,756 B2 | 8/2010 | Krikorian et al. |
| 7,778,372 B2 | 8/2010 | Takashima |
| 7,788,696 B2 | 8/2010 | Burges et al. |
| 7,877,776 B2 | 1/2011 | Krikorian et al. |
| 7,913,278 B2 | 3/2011 | Ellis et al. |
| 7,917,932 B2 | 3/2011 | Krikorian |
| 7,921,446 B2 | 4/2011 | Krikorian et al. |
| 7,975,062 B2 | 7/2011 | Krikorian et al. |
| 7,992,176 B2 | 8/2011 | Margulis |
| 8,041,988 B2 | 10/2011 | Tarra et al. |
| 8,051,454 B2 | 11/2011 | Krikorian et al. |
| 8,060,609 B2 | 11/2011 | Banger et al. |
| 8,060,906 B2 | 11/2011 | Begeja et al. |
| 8,060,909 B2 | 11/2011 | Krikorian et al. |
| 8,099,735 B2 | 1/2012 | Sterbenz |
| 8,099,755 B2 | 1/2012 | Bajpai et al. |
| 8,135,852 B2 | 3/2012 | Nilsson et al. |
| 8,149,851 B2 | 4/2012 | Asnis et al. |
| 8,169,914 B2 | 5/2012 | Bajpai et al. |
| 8,171,148 B2 | 5/2012 | Lucas et al. |
| 8,218,657 B2 | 7/2012 | Spilo |
| 8,224,982 B2 | 7/2012 | Langille |
| 8,266,657 B2 | 9/2012 | Margulis |
| 8,314,893 B2 | 11/2012 | Ravi |
| 8,346,605 B2 | 1/2013 | Krikorian et al. |
| 8,350,971 B2 | 1/2013 | Malone et al. |
| 8,352,991 B2 | 1/2013 | Cahnbley et al. |
| 8,355,436 B2 | 1/2013 | Haskell et al. |
| 8,365,236 B2 | 1/2013 | Krikorian et al. |
| 8,374,085 B2 | 2/2013 | Poli et al. |
| 8,406,431 B2 | 3/2013 | Nandury |
| 8,621,533 B2 | 12/2013 | Krikorian et al. |
| 8,799,969 B2 | 8/2014 | Krikorian et al. |
| 8,819,750 B2 | 8/2014 | Krikorian et al. |
| 9,106,723 B2 | 8/2015 | Krikorian et al. |
| 2001/0004733 A1 | 6/2001 | Eldering |
| 2001/0007097 A1 | 7/2001 | Kim |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0019984 A1 | 2/2002 | Rakib |
| 2002/0031333 A1 | 3/2002 | Mano et al. |
| 2002/0032907 A1 | 3/2002 | Daniels |
| 2002/0046404 A1 | 4/2002 | Mizutani |
| 2002/0053053 A1 * | 5/2002 | Nagai et al. | 714/712 |
| 2002/0059591 A1 | 5/2002 | Nakagawa |
| 2002/0080753 A1 | 6/2002 | Lee |
| 2002/0083009 A1 | 6/2002 | Lansing et al. |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 * | 9/2002 | Jang | G06T 9/008 375/240.11 |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0151992 A1 | 10/2002 | Hoffberg et al. |
| 2002/0154892 A1 | 10/2002 | Hoshen et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2002/0196853 A1 | 12/2002 | Liang et al. |
| 2003/0001016 A1 | 1/2003 | Fraier et al. |
| 2003/0001846 A1 | 1/2003 | Davis et al. |
| 2003/0001880 A1 | 1/2003 | Holtz et al. |
| 2003/0028643 A1 | 2/2003 | Jabri |

(56) References Cited

U.S. PATENT DOCUMENTS

| | | |
|---|---|---|
| 2003/0028873 A1 | 2/2003 | Lemmons |
| 2003/0030752 A1 | 2/2003 | Begeja et al. |
| 2003/0065915 A1 | 4/2003 | Yu et al. |
| 2003/0070167 A1 | 4/2003 | Holtz et al. |
| 2003/0078973 A1 | 4/2003 | Przekop et al. |
| 2003/0088686 A1 | 5/2003 | Jennings |
| 2003/0088687 A1 | 5/2003 | Begeja et al. |
| 2003/0093260 A1 | 5/2003 | Dagtas et al. |
| 2003/0095791 A1 | 5/2003 | Barton et al. |
| 2003/0105831 A1 | 6/2003 | O'Kane |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0220905 A1 | 11/2003 | Amado et al. |
| 2003/0231621 A1 | 12/2003 | Gubbi et al. |
| 2003/0231655 A1* | 12/2003 | Kelton ............... H04N 7/17318 370/468 |
| 2003/0234803 A1 | 12/2003 | Toyama et al. |
| 2004/0003406 A1 | 1/2004 | Billmaier |
| 2004/0049791 A1 | 3/2004 | Shah et al. |
| 2004/0052216 A1 | 3/2004 | Roh |
| 2004/0068334 A1 | 4/2004 | Tsai et al. |
| 2004/0068536 A1 | 4/2004 | Demers et al. |
| 2004/0083301 A1 | 4/2004 | Murase et al. |
| 2004/0098748 A1 | 5/2004 | Bo et al. |
| 2004/0100486 A1 | 5/2004 | Flamini et al. |
| 2004/0101271 A1 | 5/2004 | Boston et al. |
| 2004/0103340 A1 | 5/2004 | Sundareson et al. |
| 2004/0139047 A1 | 7/2004 | Rechsteiner et al. |
| 2004/0153951 A1 | 8/2004 | Walker et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0177063 A1 | 9/2004 | Weber et al. |
| 2004/0205830 A1 | 10/2004 | Kaneko |
| 2004/0212640 A1 | 10/2004 | Mann et al. |
| 2004/0215458 A1 | 10/2004 | Kobayashi et al. |
| 2004/0216173 A1 | 10/2004 | Horoszowski et al. |
| 2004/0220791 A1 | 11/2004 | Lamkin et al. |
| 2004/0220926 A1 | 11/2004 | Lamkin et al. |
| 2004/0236844 A1 | 11/2004 | Kocherlakota |
| 2004/0246936 A1 | 12/2004 | Perlman |
| 2004/0254887 A1 | 12/2004 | Jacoby |
| 2004/0255249 A1 | 12/2004 | Chang et al. |
| 2005/0021398 A1 | 1/2005 | McCleskey et al. |
| 2005/0021830 A1 | 1/2005 | Urzaiz et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0165795 A1 | 7/2005 | Myka et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0223087 A1 | 10/2005 | Van Der Stok |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0246738 A1 | 11/2005 | Lockett et al. |
| 2005/0251833 A1 | 11/2005 | Schedivy |
| 2005/0262534 A1 | 11/2005 | Bontempi et al. |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | van Beek |
| 2006/0095943 A1 | 5/2006 | Demircin et al. |
| 2006/0101499 A1 | 5/2006 | Aravamudan et al. |
| 2006/0107226 A1 | 5/2006 | Matthews et al. |
| 2006/0146174 A1 | 7/2006 | Hagino |
| 2006/0156219 A1 | 7/2006 | Haot et al. |
| 2006/0156374 A1 | 7/2006 | Hu et al. |
| 2006/0174026 A1 | 8/2006 | Robinson et al. |
| 2006/0184980 A1 | 8/2006 | Cole |
| 2006/0206581 A1 | 9/2006 | Howarth et al. |
| 2006/0280157 A1 | 12/2006 | Karaoguz et al. |
| 2006/0287916 A1 | 12/2006 | Starr et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0097257 A1 | 5/2007 | El-Maleh et al. |
| 2007/0127437 A1 | 6/2007 | Ozawa |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0260462 A1 | 11/2007 | Andrsen et al. |
| 2007/0286596 A1 | 12/2007 | Lonn |
| 2007/0290876 A1 | 12/2007 | Sato et al. |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195744 A1 | 8/2008 | Bowra et al. |
| 2008/0199150 A1 | 8/2008 | Candelore |
| 2008/0256485 A1 | 10/2008 | Krikorian |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0080448 A1 | 3/2009 | Tarra et al. |
| 2009/0157697 A1 | 6/2009 | Conway et al. |
| 2009/0199248 A1 | 8/2009 | Ngo et al. |
| 2009/0252219 A1 | 10/2009 | Chen et al. |
| 2009/0300205 A1 | 12/2009 | Jabri |
| 2010/0001960 A1 | 1/2010 | Williams |
| 2010/0005483 A1 | 1/2010 | Rao |
| 2010/0064055 A1 | 3/2010 | Krikorian et al. |
| 2010/0064332 A1 | 3/2010 | Krikorian et al. |
| 2010/0070925 A1 | 3/2010 | Einaudi et al. |
| 2010/0071076 A1 | 3/2010 | Gangotri et al. |
| 2010/0100915 A1 | 4/2010 | Krikorian et al. |
| 2010/0129507 A1 | 5/2010 | Abu-Ali et al. |
| 2010/0146527 A1 | 6/2010 | Craib et al. |
| 2010/0192184 A1 | 7/2010 | Margulis |
| 2010/0192185 A1 | 7/2010 | Margulis |
| 2010/0192188 A1 | 7/2010 | Rao |
| 2010/0232438 A1 | 9/2010 | Bajpai et al. |
| 2011/0032986 A1 | 2/2011 | Banger et al. |
| 2011/0033168 A1 | 2/2011 | Iyer |
| 2011/0035290 A1 | 2/2011 | Mortillaro et al. |
| 2011/0035462 A1 | 2/2011 | Akella |
| 2011/0035467 A1 | 2/2011 | Thiyagarajan |
| 2011/0035668 A1 | 2/2011 | Thiyagarajan |
| 2011/0035669 A1 | 2/2011 | Shirali et al. |
| 2011/0035741 A1 | 2/2011 | Thiyagarajan |
| 2011/0035765 A1 | 2/2011 | Shirali |
| 2011/0055864 A1 | 3/2011 | Shah et al. |
| 2011/0113354 A1 | 5/2011 | Thiyagarajan et al. |
| 2011/0119325 A1 | 5/2011 | Paul et al. |
| 2011/0150432 A1 | 6/2011 | Paul et al. |
| 2011/0153718 A1 | 6/2011 | Dham et al. |
| 2011/0153845 A1 | 6/2011 | Rao et al. |
| 2011/0158610 A1 | 6/2011 | Paul et al. |
| 2011/0185393 A1 | 7/2011 | Krikorian et al. |
| 2011/0191456 A1 | 8/2011 | Jain |
| 2011/0208506 A1 | 8/2011 | Gurzhi et al. |

(56) References Cited

U.S. PATENT DOCUMENTS

| | | | |
|---|---|---|---|
| 2011/0219413 | A1 | 9/2011 | Krikorian et al. |
| 2011/0283332 | A1 | 11/2011 | Margulis |
| 2012/0030718 | A1 | 2/2012 | Margulis |
| 2013/0185163 | A1 | 7/2013 | Krikorian et al. |

FOREIGN PATENT DOCUMENTS

| | | | |
|---|---|---|---|
| EP | 0690626 | A2 | 1/1996 |
| EP | 1443766 | A2 | 8/2004 |
| GB | 2307151 | A | 5/1997 |
| JP | 11289350 | A | 10/1999 |
| JP | 2003046582 | A | 2/2003 |
| JP | 2003101547 | A | 4/2003 |
| JP | 2003114845 | A | 4/2003 |
| JP | 2004007127 | A | 1/2004 |
| JP | 2004072686 | A | 3/2004 |
| JP | 2005032120 | | 2/2005 |
| JP | 2005039781 | A | 2/2005 |
| KR | 19990082855 | A | 11/1999 |
| KR | 20010211410 | A | 8/2001 |
| KR | 100367581 | B1 | 12/2002 |
| KR | 1020050013418 | A | 2/2005 |
| TW | 200703018 | A | 1/2007 |
| WO | 0072596 | A1 | 11/2000 |
| WO | 0133839 | A1 | 5/2001 |
| WO | 0147248 | A2 | 6/2001 |
| WO | 0193161 | A1 | 12/2001 |
| WO | 03026232 | A1 | 3/2003 |
| WO | 03052552 | A2 | 6/2003 |
| WO | 2004032511 | A1 | 4/2004 |
| WO | 2005122025 | A2 | 12/2005 |
| WO | 2008024723 | A | 2/2008 |

OTHER PUBLICATIONS

U.S. Office Action in U.S. Appl. No. 14/979,271 dated Sep. 2, 2016.
U.S. Office Action in U.S. Appl. No. 13/194,783 dated Sep. 20, 2016.
U.S. Appl. No. 11/620,711, filed Jan. 7, 2007.
U.S. Appl. No. 13/730,425, filed Dec. 28, 2012.
U.S. Appl. No. 60/577,833, filed Jun. 7, 2004.
U.S. Appl. No. 60/823,066, filed Aug. 21, 2006.
U.S. Final Office Action in U.S. Appl. No. 13/730,425, filed Oct. 18, 2016.
U.S. Notice of Allowance and Fee(s) Due in U.S. Appl. No. 13/194,834, filed Oct. 21, 2016.
U.S. Notice of Allowance and Fee(s) Due for U.S. Appl. No. 14/979,271 dated Mar. 27, 2017.
U.S. Final Office Action for U.S. Appl. No. 13/194,783 dated Apr. 12, 2017.
U.S. Notice of Allowance and Fee(s) Due in U.S. Appl. No. 14/558,490 dated Sep. 9, 2015.
U.S. Office Action in U.S. Appl. No. 13/194,834 dated Sep. 18, 2015.
U.S. Office Action in U.S. Appl. No. 13/730,425 dated Sep. 21, 2015.
U.S. Office Action in U.S. Appl. No. 14/798,227 dated Sep. 21, 2015.
U.S. Office Action in U.S. Appl. No. 14/809,012 dated Sep. 21, 2015.
U.S. Notice of Allowance and Fee(s) Due in U.S. Appl. No. 14/468,059 dated Sep. 29, 2015.
Utility U.S. Appl. No. 14/809,012, filed Jul. 24, 2015.
Japan Patent Office, Notice of Grounds for Rejection in Japanese Divisional Patent Application No. 2014-166162 dated Apr. 28, 2015.
State Intellectual Property Office of the People's Republic of China, Notification of Reexamination for Chinese Patent Application No. 200810161874.X dated Apr. 7, 2015.
U.S. Notice of Allowance and Fee(s) Due for U.S. Appl. No. 12/827,964 dated Apr. 29, 2015.
U.S. Non-Final Office Action, dated May 15, 2014 for U.S. Appl. No. 13/194,783.
U.S. Notice of Allowance, dated May 28, 2014 for U.S. Appl. No. 13/615,306.
Continuation U.S. Appl. No. 14/468,059, filed Aug. 25, 2014.
State Intellectual Property Office of the People's Republic of China, Office Action for Chinese Patent Application No. 201210572890.4 dated Feb. 9, 2015.
U.S. Office Action for U.S. Appl. No. 14/468,059 dated Apr. 7, 2015.
U.S. Notice of Allowance and Fee(s) Due for U.S. Appl. No. 14/144,225 dated Apr. 8, 2015.
U.S. Patent and Trademark Office, Non-Final Office Action, dated Jul. 16, 2014 for U.S. Appl. No. 13/194,834.
U.S. Patent and Trademark Office, Final Office Action, dated Sep. 4, 2014 for U.S. Appl. No. 12/827,964.
U.S. Patent and Trademark Office, Non-Final Office Action, dated Sep. 5, 2014 for U.S. Appl. No. 14/144,225.
China State Intellectual Property Office, Second Office Action, dated Nov. 5, 2014 for China Patent Application No. 200980151308.3.
Office of the Controller-General of Patents, Designs and Trademarks, First Examination Report for Indian Patent Application No. 4190/KOLNP/2007 dated Feb. 27, 2015.
European Patent Office, Communication under Rule 71(3) EPC for European Patent Application No. 06 734 554.6 dated Feb. 13, 2015.
European Patent Office, Communication pursuant to Article 94(3) EPC for European Patent Application No. 05 758 509.3 dated Mar. 3, 2015.
U.S. Office Action for U.S. Appl. No. 14/449,896 dated Feb. 18, 2015.
U.S. Final Office Action for U.S. Appl. No. 13/194,834 dated Mar. 3, 2015.
Utility U.S. Appl. No. 14/449,896, filed Aug. 1, 2014.
Canadian Intellectual Property Office, Office Action mailed Sep. 30, 2013 for Canadian Patent Application No. 2,747,539.
U.S. Final Office Action dated Dec. 5, 2013 for U.S. Appl. No. 13/194,834.
U.S. Non-Final Office Action, dated Jan. 6, 2014 for U.S. Appl. No. 13/615,306.
U.S. Non-Final Office Action, dated Jan. 6, 2014 for U.S. Appl. No. 12/827,964.
Eurpoean Patent Office, Examination Report, dated Sep. 6, 2013 for European Patent Application No. 12 187 858.1.
Canadian Intellectual Property Office, Office Action, dated Sep. 3, 2013 for Canadian Patent Application No. 2,660,350.
European Patent Office, Examination Report, dated Jul. 25, 2013 for European Patent Application No. 05 758 509.3.
China State Intellectual Property Office, First Office Action, dated Aug. 2, 2013 for Chinese Patent Application No. 200980151308.3.
U.S. Final Office Action, dated Sep. 19, 2013 for U.S. Appl. No. 13/107,341.
U.S. Notice of Allowance, dated Sep. 20, 2013 for U.S. Appl. No. 13/079,644.
China State Intellectual Property Office, Office Action, dated Sep. 29, 2013 for Chinese Patent Application No. 200810161874.X.
Japan Patent Office, Hearing, dated Aug. 13, 2013 for Japanese Patent Application No. P2008-507651.
Li Zhuo et al: "Adaptive forward error correction for streaming stored MPEG-4 FGS video over wireless channel", IEEE 5th Workshop on Signal Processing Advances in Wireless Communications, 2004, Jan. 1, 2004 (Jan. 1, 2004), pp. 26-30, XP055091312, DOI: 10.1109/SPAEC.2004.1439196 ISBN: 978-0-78-038337-1.
European Patent Office, Summons to attend oral proceedings pursuant to Rule 115(1) EPC, dated Jan. 15, 2014 for European Patent Application No. 06734554.6.
Japan Patent Office, Notice of Ground(s) for Rejection, dated Feb. 18, 2014 for Japanese Patent Application No. P2008-507651.
Office of the Controller-General of Patents, Designs and Trademarks, First Examination Report, dated Mar. 21, 2014 for India Patent Application No. 3740/KOLNP/2006.
U.S. Non-Final Office Action, dated Mar. 27, 2014 for U.S. Appl. No. 13/073,469.

(56) References Cited

OTHER PUBLICATIONS

"The Authoritative Dictionary of IEEE Standard Terms," 7th ed. 2000.
Newton's Telcom Dictionary, 20th ed., Mar. 2004.
U.S. Non-Final Office Action dated Apr. 1, 2010; U.S. Appl. No. 12/237,103, filed Sep. 24, 2008.
U.S. Final Office Action dated Mar. 12, 2010; U.S. Appl. No. 11/620,711, filed Jan. 7, 2007.
International Search Report and Written Opinion for PCT/US2006/04382, dated Apr. 27, 2007.
International Search Report and Written Opinion, PCT/US2005/020105, dated Feb. 15, 2007, 6 pages.
Faucon, B. "TV 'Brick' Opens up Copyright Can of Worms,"Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01 &pagetype+printer§ion+1053801318705&path+articles/2003/06/30/0156825330084.html].
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Balster, Eric J., "Video Compression and Rate Control Methods Based on the Wavelet Transform," The Ohio State University 2004, pp. 1-24.
Skodras et al., "JPEG2000: The Upcoming Still Image Compression Standard," May 11, 2000, 14 pages.
Kulapala et al., "Comparison of Traffic and Quality Characteristics of Rate-Controlled Wavelet and DCT Video," Arizona State University, Oct. 11, 2004.
Kessler, Gary C., An Overview of TCP/IP Protocols and the Internet; Jan. 16, 2007, retrieved from the Internet on Jun. 12, 2008 at http://www.garykessler.net/libraty/tcpip.html; originally submitted to the InterNIC and posted on their Gopher site on Aug. 5, 1994.
Taubman et al., "Embedded Block Coding in JPEG2000," Feb. 23, 2001, pp. 1-8 of 36.
Roe, Kevin, Third-Party Submission for Published Application Under CFR §1.99, Mar. 26, 2008.
Roe, Kevin, "Third-Party Observation Under EPC Article 115 on the Patentability of an Invention," Dec. 21, 2007.
Sikora, Thomas "Trends and Perspectives in Image and Video Coding," Proceedings of the IEEE, vol. 93 No. 1, pp. 6-17, Jan. 1, 2005.
Vetro, Anthony et al. "Video Transcoding Architectures and Techniques: An Overview," IEEE Signal Processing Magazine, vol. 20, No. 2, pp. 18-29, Mar. 1, 2003.
De Lattre, Alexis et al. "VideoLAN Streaming Howto," Internet Citation, Jan. 22, 2005; http://www.videolan.org/doc/streaming-howto/en/.
European Patent Office "Extended European Search Report" dated Feb. 28, 2011; Appln. No. 06734554.
Japan Patent Office "Decision of Rejection (Final Rejection)," dated Mar. 15, 2011; Japanese Appln. No. 2007-527683.
China Patent Office "Second Office Action of China State Intellectual Property Office" dated May 18, 2011; Appln. No. 200780030811.4.
China State Intellectual Property Office "First Office Action of China State Intellectual Property Office," dated Oct. 9, 2010; Application No. 200780030811.4.
European Patent Office "EPO Communication" dated Nov. 29, 2010; Application No. 08 167 880.7-2202.
Korean Intellectual Property Office "Official Notice of Preliminary Rejection," dated Dec. 29, 2010; Patent Application No. 10-2009-7003607.
China State Intellectual Property Office "Second Office Action of China State Intellectual Property Office, " dated Aug. 26, 2010; Application No. 200810126554.0.
U.S. Non-Final Office Action dated Sep. 30, 2010; U.S. Appl. No. 12/758,193, filed Apr. 12, 2010.

U.S. Non-Final Office Action dated Sep. 29, 2010; U.S. Appl. No. 12/758,194, filed Apr. 12, 2010.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," dated Jun. 4, 2010 for International Application No. PCT/IN2009/000728, filed Dec. 18, 2009.
Korean Intellectual Property Office "Official Notice of Preliminary Rejection," dated Jun. 18, 2010; Korean Patent Application No. 10-2008-7021254.
Japan Patent Office "Notice of Grounds for Rejection (Office Action)," dated May 25, 2010; Patent Application No. 2007-0268269.
Japan Patent Office "Notice of Grounds for Rejection (Office Action)," dated May 25, 2010; Patent Application No. 2007-527683.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "Office Action" dated Mar. 18, 2010 for Application No. 200680022520.6.
Canadian Intellectual Property Office "Office Action" dated Feb. 18, 2010 for Application No. 2569610.
European Patent Office "European Search Report," dated May 7, 2010 for Application No. 06786174.0.
China State Intellectual Property Office "Office Action" dated Apr. 13, 2010 for Application No. 200580026825.X.
Australian Government "Office Action," Australian Patent Application No. 2006240518, dated Nov. 12, 2009.
China State Intellectual Property Office "First Office Action," dated Jan. 8, 2010, for Application No. 200810126554.0.
China State Intellectual Property Office "Fourth Office Action" dated Mar. 5, 2013 for Chinese Patent Appln. No. 200810161874.X.
European Patent Office Supplementary Search Report dated Mar. 6, 2013 for European Patent Appln. No. 05758509.3.
U.S. "Non-Final Office Action" dated Mar. 11, 2013 for U.S. Appl. No. 13/079,644.
U.S. "Non-Final Office Action" dated Mar. 5, 2013 for U.S. Appl. No. 13/107,341.
Intellectual Property Office "Office Action" dated Feb. 25, 2013 for Taiwan Patent Appln. No. 098146025.
China State Intellectual Property Office "Third Office Action" dated Dec. 5, 2012 for Chinese Patent Appln. No. 200680022520.6.
European Patent Office "Extended Search Report" dated Nov. 27, 2011 for European Patent Appln. No. 12187858.1.
European Patent Office, Extended Search Report dated May 24, 2013 for European Patent Application No. 07814265.0.
International Search Report and Written Opinion for International Application No. PCT/US2006/025911, dated Jan. 3, 2007.
International Search Report for International Application No. PCT/US2007/063599, dated Dec. 12, 2007.
International Search Report for International Application No. PCT/US2007/076337, dated Oct. 20, 2008.
International Search Report and Written Opinion for International Application No. PCT/US2006/025912, dated Jul. 17, 2008.
International Search Report for International Application No. PCT/US2008/059613, dated Jul. 21, 2008.
International Search Report and Written Opinion for International Application No. PCT/US2008/080910, dated Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006,

(56) References Cited

OTHER PUBLICATIONS

XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.

Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.

Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.

Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].

Sony Corporation "LocationFree Player Pak—LocationFree Base Station—LocationFree Player" [Online] 2005, XP002512401; retrieved from the Internet: <URL:http://www.docs.sony.com/release/LFPK1.pdf; retrieved on Jan. 28, 2009.

Japan Patent Office "Hearing" dated Apr. 24, 2012; Japanese Patent Appln. No. P2007-527683.

Japan Patent Office "Hearing" dated Apr. 24, 2012; Japanese Patent Appln. No. P2007-268269.

U.S. "Final Office Action" dated Apr. 27, 2012; U.S. Appl. No. 12/347,465, filed Dec. 31, 2008.

China Intellectual Property Office "Office Action" dated Apr. 10, 2012 for Chinese Application 200810126554.0.

Japan Patent Office "Office Action" dated Feb. 28, 2012 for Japanese Application P2008-507651.

Taiwan Intellectual Property Office "Office Action" dated Feb. 23, 2012 for Taiwan Application 097137393.

Canadian Intellectual Property Office "Office Action" dated on Feb. 16, 2012 for Canadian Application 2,660,350.

China State Intellectual Property Office "Reexamination Office Action" dated Mar. 5, 2012; Chinese Appln. No. 200580026825.X.

China State Intellectual Property Office "Second Office Action" dated Feb. 15, 2012; Appln. No. CN200680022520.6.

China State Intellectual Property Office "Chinese Office Action" dated Dec. 31, 2011, for Chinese Patent Application No. 200810161874.X.

European Patent Office "European Office Action" dated Nov. 30, 2011, for European Patent Application No. 06 734 554.6-2223.

U.S. "Non-Final Office Action" dated Jan. 10, 2012; U.S. Appln. No. 12/827,964, filed Jun. 30, 2010.

Canadian Intellectual Property Office, "Office Action" dated Nov. 28, 2011; Canadian Appln. No. 2,606,235.

Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.

Lowekamp, B. et al. "A Hierarchy of Network Performance Characteristics for Grid Applications and Services," GGF Network Measurements Working Group, pp. 1-29, May 24, 2004.

Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

The International Bureau of WIPO "International Preliminary Report on Patentability" dated Jul. 14, 2011; International Appln. No. PCT/US2009/068468, filed Dec. 17, 2009.

U.S. "Notice of Allowance" dated Sep. 25, 2012 for U.S. Appl. No. 13/240,932.

U.S. "Non-Final Office Action" dated May 8, 2013 for U.S. Appl. No. 13/194,834.

U.S. "Final Office Action" dated May 8, 2103 for U.S. Appl. No. 13/194,783.

European Patent Office, European Search Report for European Application No. EP 08 16 7880, dated Mar. 4, 2009.

MYTHTV WIKI, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, dated Mar. 18, 2009.

International Searching Authority, Written Opinion and International Search Report for International Application No. PCT/US2008/087005, dated Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast : Wireless PC Multimedia Transceiver System, Nov. 1998.

"Wireless Local Area Networks: Issues in Technology and Standards" Jan. 6, 1999.

Sonic Blue "ReplayTV 5000 User's Guide," 2002, entire document.

China State Intellectual Property Office "First Office Action," dated Jul. 31, 2009, for Application No. 200580026825.X.

European Patent Office, International Searching Authority, "International Search Report," for International Application No. PCT/US2009/049006, dated Sep. 11, 2009.

U.S. "Non-Final Office Action" dated Aug. 7, 2008 for U.S. Appln. No. 11/620,711.

U.S. "Final office Action" dated Feb. 9, 2009 for U.S. Appl. No. 11/620,711.

U.S. Non-Final Office Action, mailed Sep. 3, 2009; U.S. Appl. No. 11/620,711, filed Jan. 7, 2007.

China State Intellectual Property Office, Decision of Rejection:, dated Sep. 15, 2011; Chine Patent Appln. No. 200780030811.4.

Japan Patent Office "Notice of Grounds for Rejection (Office Action)" dated Jun. 28, 2011; Japanese Patent Appln. No. P2008-507651.

Australian Government "Notice of Acceptance" dated Aug. 10, 2011; Patent Appln. No. 2006240518.

U.S. "Non-Final Office Action" dated Sep. 6, 2011; U.S. Appl. No. 12/347,465, filed Dec. 31, 2008.

Canadian Patent Office "Office Action" dated Mar. 17, 2011; Canadian Patent Appln. No. 2,606,235.

China Patent Office "Office Action" dated Jan. 6, 2011; Chinese Patent Appln. No. 200810126554.0.

(56) References Cited

OTHER PUBLICATIONS

China Patent Office "Office Action" dated Feb. 23, 2011; Chinese Patent Appln. No. 200680022520.6.
European Patent Office, European Search Report, dated Sep. 28, 2009 for European Application No. EP 06 78 6175.
International Search Report for PCT/US2008/069914 dated Dec. 19, 2008.
European Patent Office "International Search Report" dated Sep. 13, 2010 for International Appln. No. PCT/US2009/054893.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
U.S. "Notice of Allowance" dated Aug. 31, 2012 for U.S. Appl. No. 11/620,711.
M2 Presswire, Aug. 16, 2006, OTCPicks.com: Daily Market Movers Digest Midday Stock Alerts for Wednesday, Aug. 16th; AMRU, IPTM, BCLC, IHDR, EGIL © 1994-2006 M2 Communications LTD.
U.S. "Final Office Action" dated Jun. 6, 2012 for U.S. Appl. No. 12/827,964.
Japanese Patent Office "Decision of Rejection (Final Rejection)" dated Jan. 29, 2013 for Japanese Patent Appln. No. 2008-507651.
European Patent Office "Office Action" dated Aug. 7, 2012 for European Patent Appln. No. 06 734 554.6.
China Patent Office "Office Action" dated Aug. 3, 2012 for Chinese Patent Appln. No. 200810161874.X.
U.S. "Non-Final Office Action" dated Oct. 23, 2012 for U.S. Appl. No. 13/194,783, filed Jul. 29, 2011.
European Patent Office, International Searching Authority, "International Search Report," dated Mar. 30, 2010; International Application PCT/US2009/068468 filed Dec. 27, 2009.
U.S. Office Action dated Jun. 19, 2013 for U.S. Appl. No. 12/827,964.
U.S. Office Action dated Jun. 20, 2013 for U.S. Appl. No. 13/615,306.
U.S. Final Office Action dated Jul. 17, 2013 for U.S. Appl. No. 13/079,644.
China State Intellectual Property, Office Action, dated Jul. 1, 2013 for China Patent Appln. No. 200680022520.6.

\* cited by examiner

METHOD FOR EFFECTIVELY IMPLEMENTING A MULTI-ROOM TELEVISION SYSTEM

CROSS-REFERENCE TO RELATED APPLICATIONS

This Application is a continuation of, and claims priority in, U.S. patent application Ser. No. 13/609,033, which is a continuation of U.S. patent application Ser. No. 11/111,265, which application is a Continuation-in-Part of, and claims priority in, U.S. patent application Ser. No. 09/809,868, entitled "Apparatus and Method For Effectively Implementing A Wireless Television System" that was filed on Mar. 15, 2001. This Application also claims priority, through U.S. patent application Ser. No. 09/809,868, to issued U.S. Pat. No. US 6,263,503 81, entitled "Method For Effectively Implementing A Wireless Television System" that was filed on May 26, 1999, and that issued on Jul. 17, 2001. The foregoing related applications and patents are commonly assigned, and are hereby incorporated by reference.

BACKGROUND SECTION

1. Field of Invention

The present invention relates generally to an enhanced television system, and relates more particularly to a method for effectively implementing a multi-room television system.

2. Description of the Background Art

Developing an effective method for implementing enhanced television systems is a significant consideration for contemporary television system designers and manufacturers. In conventional television systems, a display device may be utilized to view program information received from a program source. The conventional display device is typically positioned in a stationary location because of restrictions imposed by various physical connections that electrically couple the display device to all available input devices. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Furthermore, a significant proliferation in the number of potential program sources (both live broadcasts and digitally recorded) may benefit a system user by providing an abundance of program material for selective viewing. For houses with televisions in more than one room of the house, each television either needs the necessary hardware to receive programming from all of the program sources, or requires a method to share the receiving hardware.

However, because of the substantially increased system complexity, television systems may require additional resources for effectively managing the control and interaction of various system components and functionalities. Therefore, for all the foregoing reasons, developing an effective method for implementing enhanced television systems remains a significant consideration for designers and manufacturers of contemporary television systems.

SUMMARY

In accordance with the present invention, a method is disclosed for effectively implementing a multi-room television system. In one embodiment, initially, a multi-room television system provides one or more program sources to a digital base station that selects the program sources for different users in different rooms or locations of the multi-room television system.

If a selected program source contains the requested video data, and does not require overlay or inclusion of program guide information, then the digital base station utilizes a media input subsystem to format the program source video data into an appropriate format, processes the formatted data to generate processed data (for example, by transcoding or encoding), and provide the processed program information for use by the output stream processor.

If the selected program source requires overlay or inclusion of program guide information, then the media input subsystem may first format the program source video into a format appropriate for combining program sources. For compressed video data, this formatting may include a full or partial decode of the video data. The media input subsystem then combines the formatted program source video information by utilizing appropriate program guide information using some combination of overlay, keying, and 2D graphics operations to produce a new combined video stream. The media input subsystem then processes the combined video stream, and provides the processed program information to an output stream processor.

Next, the output steam processor combines the processed audio, video, and data into a processed stream. A communications processor then receives the processed stream, and responsively performs a network processing procedure to generate a transmitter-ready stream for a wired or wireless network interface. For a wired network, the transmitter-ready stream is provided to the appropriate LAN or other wired interface device for transmission to the desired destination. For a wireless transmission, a transmitter device receives and modulates the transmitter-ready stream, and performs a wireless network transmission process to propagate a broadcast stream to a remote TV, a remote controller, an auxiliary base station, or any other compatible display receiver device.

The communication processor may feed back network information from the various wired and wireless network connections to the media input subsystem. The media input subsystem uses the network feedback information in order to affect formatting and processing of the video data. The encoding and transcoding processes may be more effectively accomplished by understanding and utilizing the network feedback information. Additionally, the encoding step may be combined with forward error correction protection in order to prepare the transmitter-ready stream for channel characteristics of the transmission channel. The communications processor may make additional optimizations in choosing what type of network protocol is used for different elements of the processed stream.

One or more remote TVs (or any other compatible display receiver devices) may receive the transmitted stream from the digital base station. An input subsystem in the remote TVs may then perform a network processing procedure to generate a received stream. In order to separate out the audio, video, and data portions of the transmission, a demultiplexer separates out the audio and data streams, and performs data and audio processing while passing along the video processing to one of the other blocks. The remote TV may include a variety of video decoders including an ATSC decoder for MPEG-2 High Definition Television (HDTV), as well as a decoder capable of decoding one or more different compression formats including MPEG-2, MPEG-4, VC1, H.264, vector quantization, wavelet transform, 3D wavelet transform, or another type of video compression.

Therefore, for at least the foregoing reasons, the present invention effectively implements a flexible multi-room television system that utilizes various heterogeneous components to facilitate optimal system interoperability and functionality. The present invention thus effectively and efficiently implements an enhanced multi-room television system.

DETAILED DESCRIPTION SECTION

The present invention relates to an improvement in television systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a method for effectively implementing a multi-room television system, and includes a digital base station that processes and combines various program sources to produce a processed stream. A communications processor then responsively transmits the processed stream as a local composite stream to various fixed and portable wireless display devices for flexible viewing at variable remote locations. Users at the remote locations may select the program sources for their viewing device, and may request supplemental program information, including a program guide, which the digital base station provides as part of the local composite stream.

Figure 1:
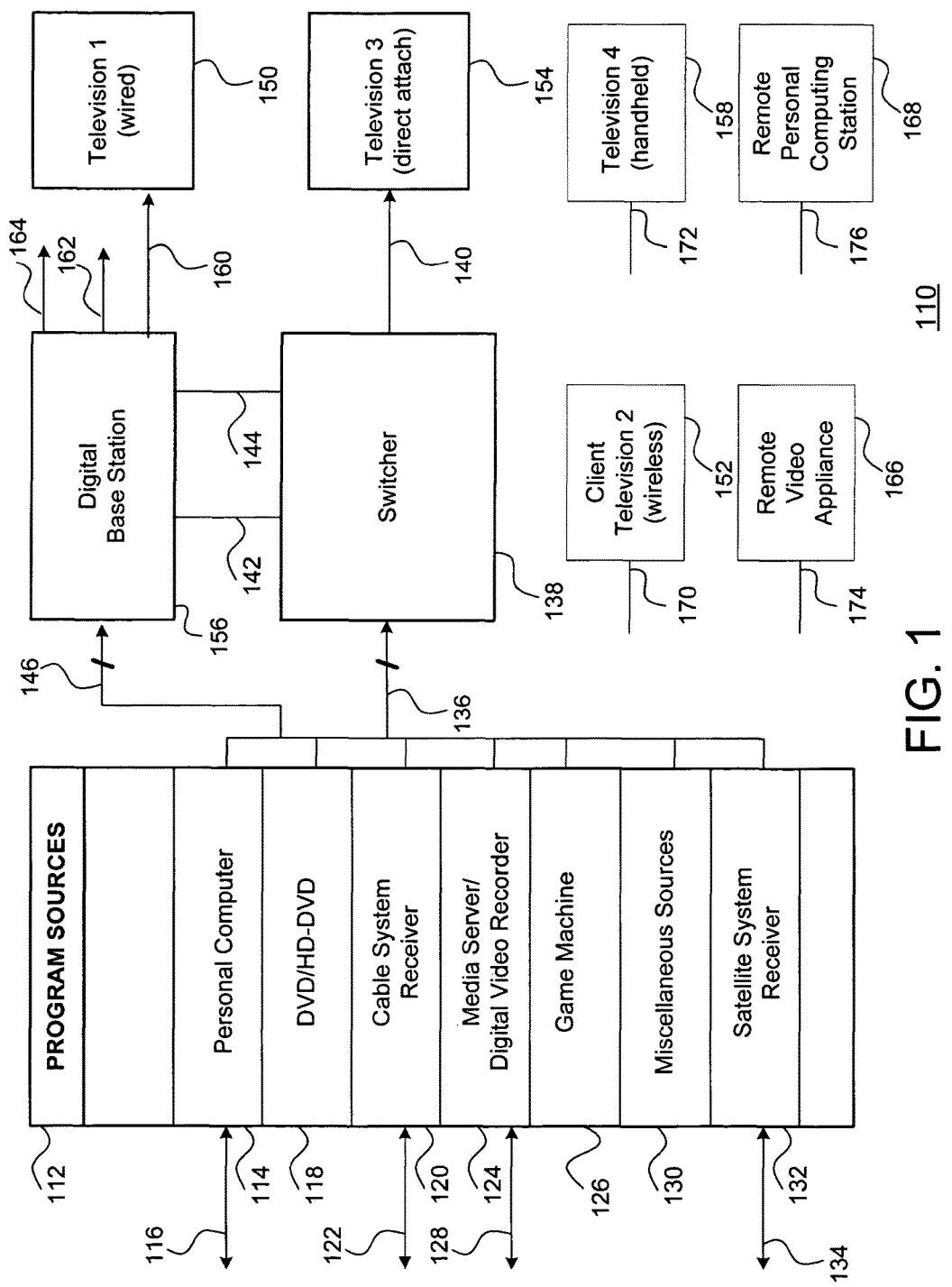
FIG. 1 is a block diagram for one embodiment of a multi-room television system, in accordance with the present invention.

Referring now to FIG. 1, a block diagram of a basic multi-room television system 110 is shown, in accordance with one embodiment of the present invention. In the FIG. 1 embodiment, multi-room television system 110 includes, but is not limited to, a number of programs sources 112, a switcher 138, a digital base station 156, a first wired television (TV) 150, a second wireless client television (TV) 152, a third wired television (TV) 154, a fourth handheld television (TV) 158, and a remote personal computing station 168. Each of these display devices may be capable of different display formats including but not limited to Standard Definition Television (SDTV) formats, High Definition Television (HDTV) formats or other high resolution formations such as XGA, SXGA, UXGA, and 1080 Progressive (1080P). In other embodiments of the present invention, multi-room television system 110 may include components or configurations that are different from, or in addition to, certain of those described in conjunction with the FIG. 1 embodiment. One other such system allows remote use of a personal computer through the multi-room TV system 110.

In the FIG. 1 embodiment, multi-room television system 110 is configured for economical and efficient use in a home environment. However, in alternate embodiments, the present invention may be implemented for use in any appropriate environment. In the FIG. 1 embodiment, program sources 112 comprise a selectable variety of consumer electronics devices that may include, but are not limited to, a personal computer 114 that communicates with other devices or to a network through input/output (I/O) path 116, a digital video disk device or a high-definition DVD (DVD/HD-DVD device) 118, a cable system receiver 120 that receives a cable TV signal on path 122, a media server/digital video recorder 124 that stores and provides various types of selectable programming that may connect to other sources of program content over connection 128, a game machine 126 that may include network gaming, and miscellaneous sources 130. Miscellaneous sources 130 may include any desired type of program sources, such as local video from a surveillance camera system or from a video cassette recorder. Satellite system receiver 132 receives a satellite dish signal on path 134. The various program sources may also utilize a single device or a multi-band tuner within any of the devices. For personal computer 114, the program source 112 may be a second graphics output port from the computer, so that a primary user may use the computer 116 locally and a secondary user may use the computer 116 over the multi-room television system 110.

In alternate embodiments of the present invention, program sources 112 may be configured to include any other types of program sources or devices that are different from, or in addition to, certain of those described in conjunction with the FIG. 1 embodiment. For example, program sources 112 may provide any type of information, including video, audio, or data information that may be formatted in any compatible or appropriate format. Furthermore, program sources 112 may be implemented to include information for use in environments other than economical consumer home applications. For example, multi-room television system 110 may be configured to include program sources 112 that are intended for various other uses, including industrial, governmental, or scientific applications.

The present invention also supports various types of supplemental data transmissions that may be implemented as a separate program source 112, or may alternately be incorporated into another existing program source 112. For example, relevant program information and/or program channel guide information may be provided as a program source 112, or may be incorporated into another program source 112. Such program guide information may be provided in any suitable manner, including from a television broadcast vertical-blanking interval (VBI) signal, from MPEG system data, or from the Internet through a wide-area network (WAN) connection.

In the FIG. 1 embodiment, switcher 138 receives individual program signals from various program sources 112 via path 136. Switcher 138 then selects one or more of the program sources 112 as a switcher output program in response to control information typically provided by a viewer of system 110. Switcher 138 provides audio and video information from the switcher output program to TV 154 via path 140. Switcher 138 typically receives either analog signals or decoded digital signals from the various program sources. For video, these signals may include composite video, component video, S-Video, DVI, or HDMI.

In accordance with the present invention, switcher 138 also provides one or more program sources 112 to digital base station 156 through analog path 142 or through digital path 144. In the FIG. 1 embodiment, digital base station 156 is implemented as a discrete component in system 110. However, in alternate embodiments, digital base station 156 may be implemented as part of a set-top box (not shown) or any other component in system 110.

In addition, digital base station 156 may receive program sources 112 directly through digital paths 146. Digital paths 146 may include uncompressed program source information in the format of DVI, HDMI or other format. Alternately, digital path 146 may include compressed program source information in the form of MPEG-2, MPEG-4, VC1, H.264, or any other format used by one of the program sources 112. Each of these program sources 112 may include various types of data, as well as including conditional access protection to the program source that requires additional authentication of the signal before viewing.

In accordance with the present invention, digital base station 156 processes the received program source(s) 112, and transmits the processed program source(s) 112 as a local composite stream using various wired connections 160 and 162, or using wireless connections 164 from digital base station 156. Television 152 with connections 170, handheld television 158 with connections 172, remote video appliance 166 with connections 174, and remote personal computing station 168 with connections 176, are each configured for flexible remote viewing by a system user. The implementation and functionality of digital base station 156 and the various televisions of system 110 are further discussed below in conjunction with FIGS. 2 through 9.

Figure 2:
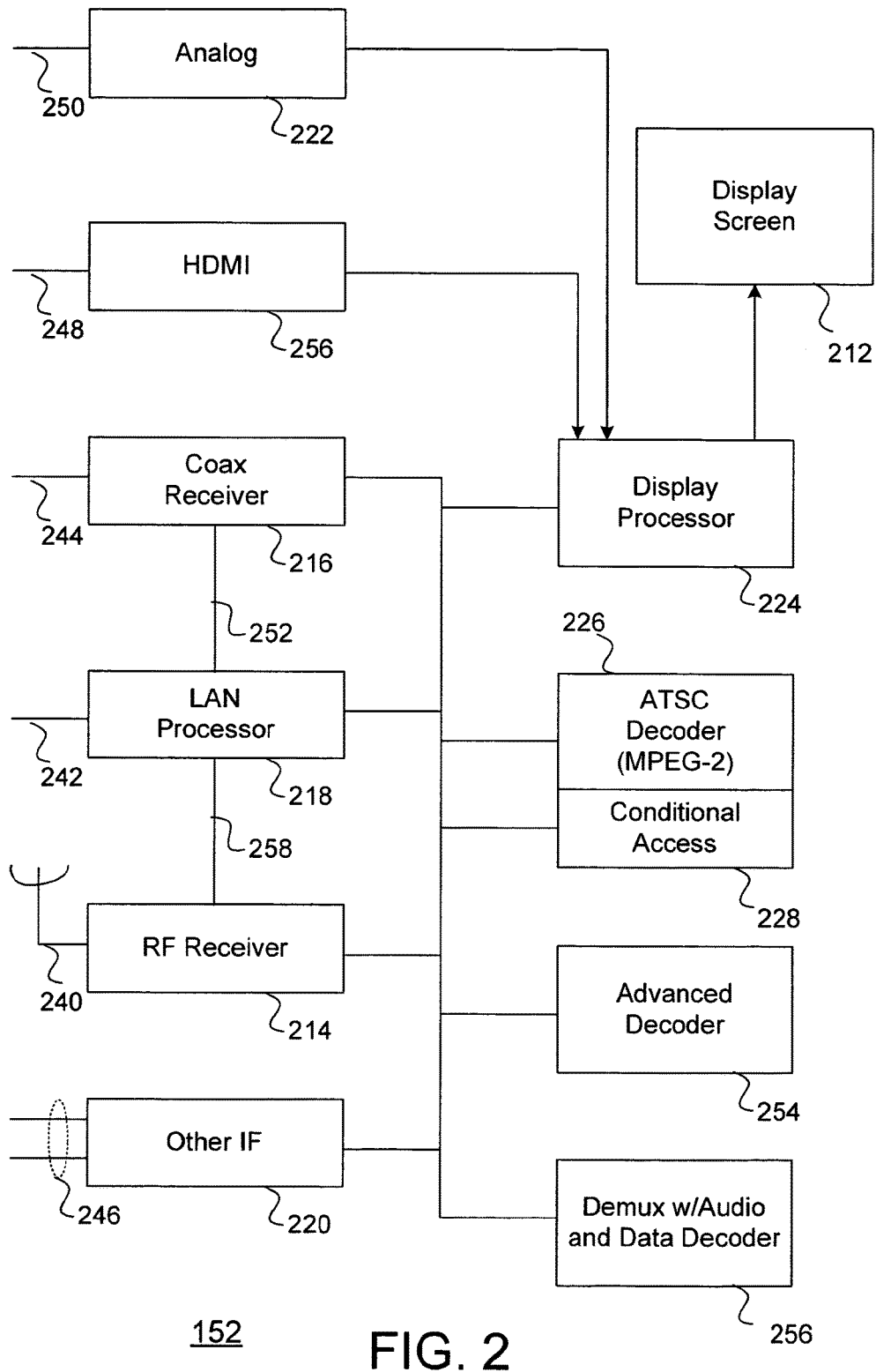
FIG. 2 is a block diagram for one embodiment of a client television of FIG. 1, in accordance with of the present invention.

Referring now to FIG. 2, a block diagram of the FIG. 1 client television 152 is shown, in accordance with one embodiment of the present invention. The FIG. 1 embodiment may also be utilized to implement certain other display devices in system 110. In the FIG. 2 embodiment, client television 152 includes, but is not limited to, a path to a display screen 212 and a variety of inputs which may include some combination of the following: an antenna unit 240 with wireless RF receiver 214; a coax cable 244 with coax receiver 216; a wired LAN connection 242 with a LAN processor 218, one or more high speed digital connections 246 with their associated processing 220 (which may include 1394 and USB receivers); HDMI 248 with HDMI receiver 256; and analog video inputs 250 with analog receiver 222.

Wireless RF receiver 214 is capable of receiving and processing a variety of wireless protocols including 802.11a, b, g, n, s, and derivatives, as well as a variety of Ultra Wide Band (UWB) versions. Antenna 240 may include one or more antennas, and combined with the wireless RF receiver 214, may use sophisticated techniques such as antenna diversity, multi-phase, Multi-Input Multi-Output (MIMO), and other related techniques. Path 258 provides a way for the RF receiver to utilize the LAN processor if such resource sharing is desired.

The coax receiver 216 may be capable of supporting a variety of analog and digital protocols. The digital protocols may include Multimedia over Coax Alliance (MoCA), Advanced Television Standards Committee (ATSC) 8-VSB modulation, Open Cable Network Interface (OCI-N) or a coax implementation of 1394, HDMI or a similar derivative. In order to separate the audio, video and data portions of the transmission, a demux with audio and data decoder 256 is the first processing block to receive the data. This block 256 performs the data and audio processing while passing along the video processing to one of the other blocks.

In the FIG. 2 embodiment, client TV 152 may include a separate ATSC decoder 226 capable of supporting High Definition Television (HDTV) including a conditional access 228 security module which is utilized for use of protected content. This conditional access may be of the form of a POD where some type of secure card is used, or the system may use software or network based keys that do not require a card. When the digital program stream is in a format other than the MPEG-2 specified for the ATSC HDTV specification, the advanced decoder 254 will decompress the video and the display processor 224 will provide the video for display screen 212.

Advanced decoder 254 is capable of decoding one or more different compression formats including MPEG-2, MPEG-4, VC1, H.264, vector quantization, wavelet transform, 3D wavelet transform, or another type of video compression. In one embodiment of the system 110, the digital base station 156 (FIG. 1) converts all of the different formats of video into a unified video format so that the advanced decoder 254 only needs to perform one type of decoding.

Additional discussion regarding the use of wavelet and 3D wavelet transform CODECs in such an optimized system 110 is presented below in conjunction with FIG. 7.

The coax receiver 216 may rely on the LAN processor 218 for additional processing and provide the demodulated information over path 252. LAN Processor 218 may also connect to the LAN over path 242 and may use Category 5 Unshielded Twisted Pair (UTP) or another type of cable. Protocols may include 10/100 Ethernet, Gigabit Ethernet, 1394C, or some other form of Residential Ethernet. Coax receiver 216 may also support the standard ATSC specification for receiving compressed bit streams.

Referring again to FIG. 1, remote personal computing station 168 is another type of client. In one embodiment, the remote user is able to fully control, or multiple users may share in a multi-user manner, a personal computer 114 from the remote locations. Instead of just selecting and controlling a program source 112, remote personal computing station 168 may also include specific controls for manipulating personal computer 114 via a remote keyboard and remote mouse. The multi-room television system 110 is able to transmit the keyboard and mouse commands from the remote personal computing station 168 over one of the network interfaces 176 to personal computer 114, and may then transmit the display from personal computer 116 through digital base station 156 for display at remote personal computing station 168. In another embodiment, a remote gaming station using a joystick or game pad instead of a keyboard and mouse may operate in a similar manner.

Figure 3:
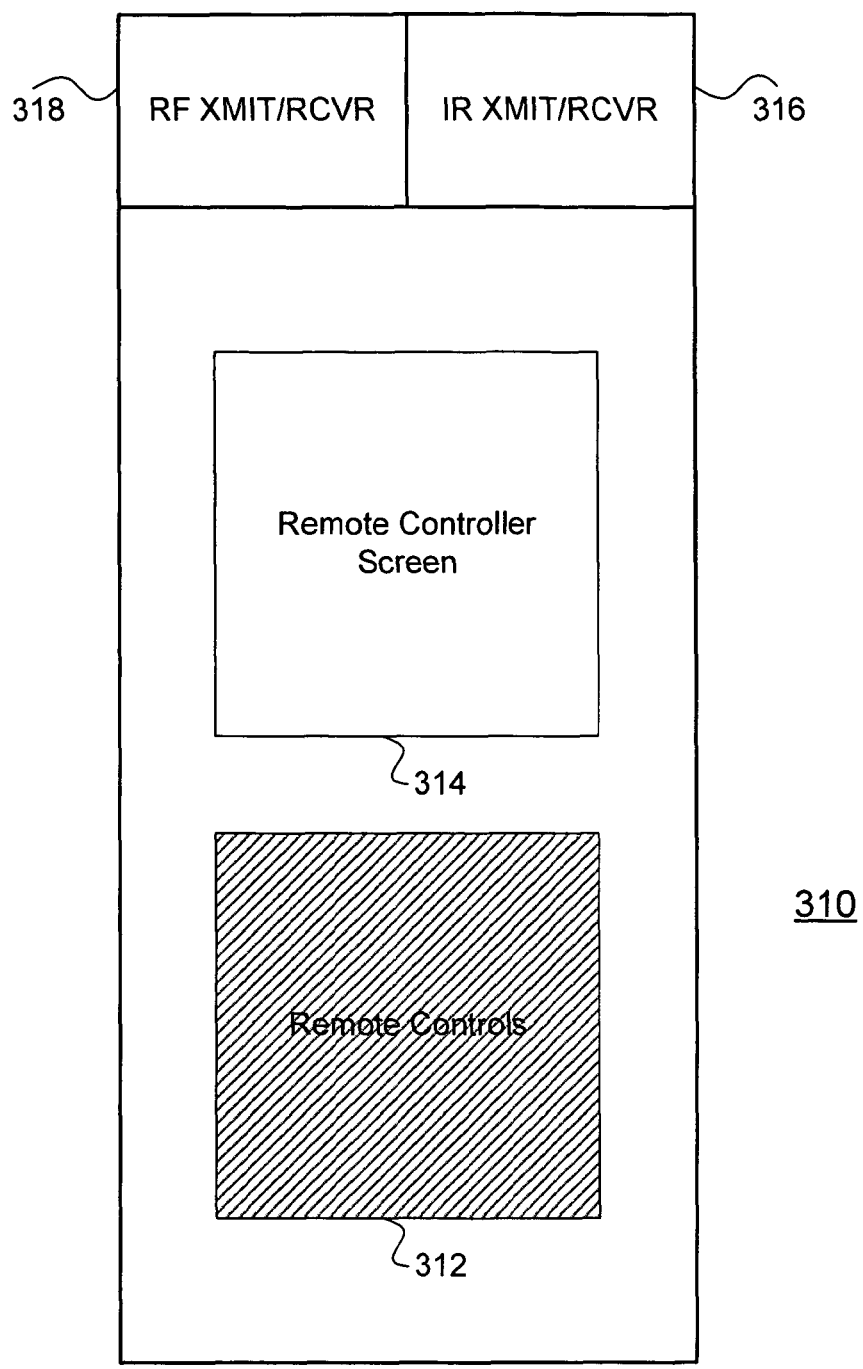
FIG. 3 is a diagram of a remote controller for use with the multi-room television system of FIG. 1, in accordance with one embodiment of the present invention.

Referring now to FIG. 3, a diagram is shown of a remote controller 310 for use as one example of the handheld television 158 in the FIG. 1 multi-room television system 110, in accordance with one embodiment of the present invention. In the FIG. 3 embodiment, remote controller 310 is a hand-held device that includes, but is not limited to, a remote controller screen 314, remote controls 312, a radio-frequency transmitter/receiver (RF XMIT/RCVR) 318, and an infrared transmitter/receiver (IR XMIT/RCVR) 316.

In the FIG. 3 embodiment, remote controls 312 may be used by a viewer to control various components and operating parameters of multi-room television system 110. For example, remote controls 312 may be used to control the operation of other components and subsystems in system 110 through a wireless transmission process using either RF XMIT/RCVR 318 or IR XMIT/RCVR 316.

Remote controller screen 314 includes display components that may be implemented using any appropriate and compatible display technology. Remote controller 310 may thus receive a local composite stream from digital base station 156 through RF XMIT/RCVR 318316, and responsively display at least one selectable program source 112 on remote controller screen 314.

In one embodiment, remote controller screen 314 may thereby allow system users to preview various different selectable program sources 112 while simultaneously viewing an uninterrupted primary program source 112 on primary TV 150 or on remote TV 152. In the foregoing preview function, remote controller screen 314 may receive a wireless transmission originating from a separate picture-in-picture (PIP) tuner in multi-room television system 110. The preview function may therefore be utilized for functions like programming program sources 112 or previewing other channels without interrupting other concurrent program viewing activities.

Figure 4:
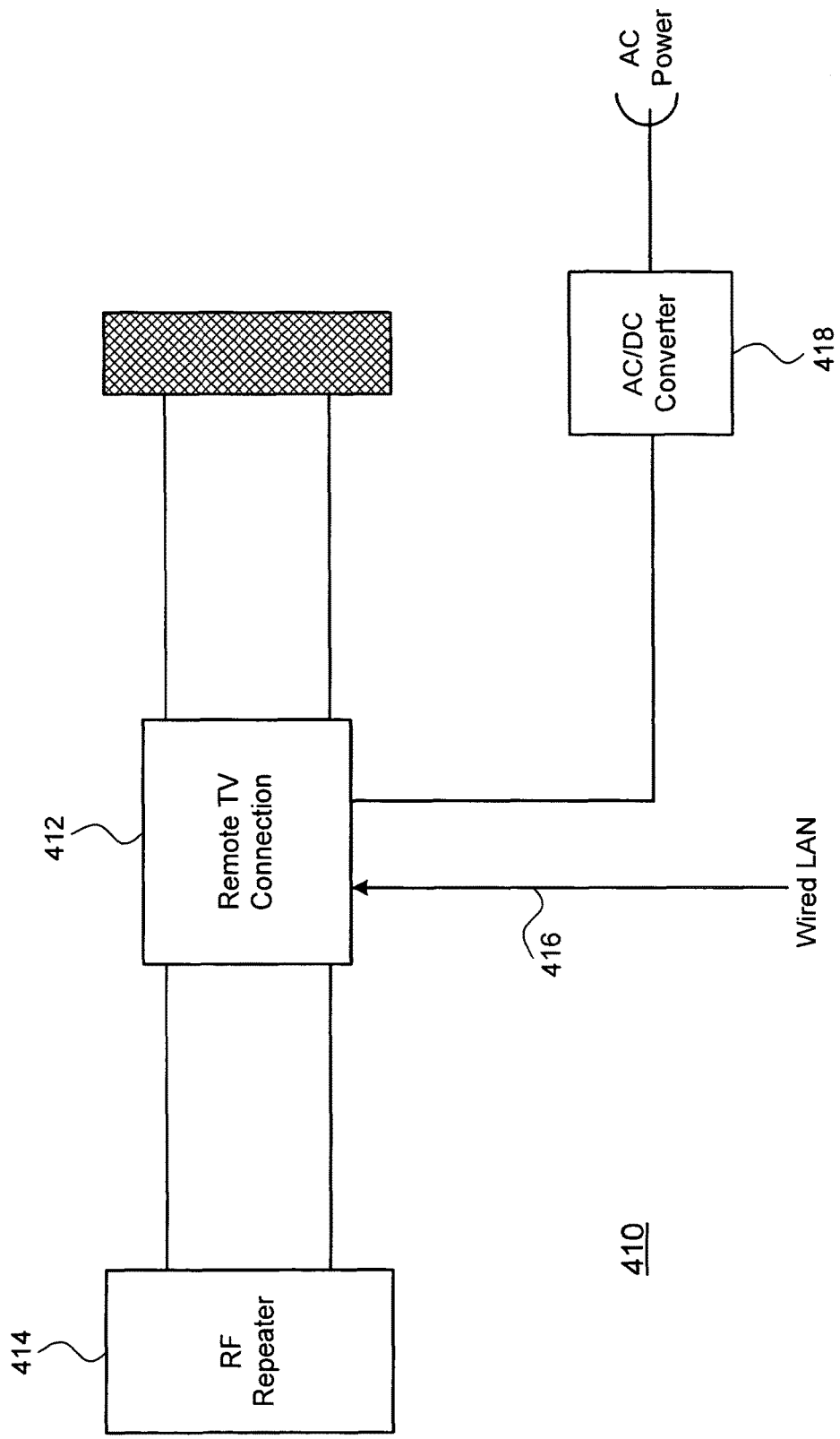
FIG. 4 is a block diagram of an auxiliary base station for use with the multi-room television system of FIG. 1, in accordance with one embodiment of present invention.

Referring now to FIG. 4, a block diagram of an auxiliary base station 410 for use with the FIG. 1 multi-room television system 110 is shown, in accordance with one embodiment of present invention. In the FIG. 4 embodiment, auxiliary base station 410 includes, but is not limited to, a radio-frequency (RF) repeater 414, a remote TV connection 412, and an alternating current/direct current (AC/DC) converter 418. In alternate embodiments, auxiliary base station 410 may readily be implemented to include various other components that are different from, or in addition to, certain of those discussed in conjunction with the FIG. 4 embodiment.

In the FIG. 4 embodiment, RF repeater 414 provides an enhanced transmission of one or more program sources 112 to remote TV 158 or remote controller 310 to thereby advantageously improve transmission quality in situations where remote TV 158 or remote controller 310 cannot receive adequate wireless transmissions directly from digital base station 156. For example, various factors such as wall density and composition, or physical distances from digital base station 156 may significantly deteriorate transmission strength and quality.

In accordance with the present invention, RF repeater 414 may then receive and enhance a local composite stream that is transmitted directly from digital base station 156 using radio-frequency transmission techniques. In such an RF repeating implementation, RF repeater 414 may act as a mesh network agent or conform to the 802.11s standard. Alternately, RF repeater 414 may receive and enhance program source transmissions and transport various types of control information provided over a hard-wired home network (wired local-area network (LAN) 416) that may be implemented using any suitable techniques and configurations.

In certain embodiments, multi-room television system 110 may include multiple auxiliary base stations 410 that each operate on a different transmission subchannel. In accordance with the present invention, remote TV 158 (FIG. 1) or remote controller 310 (FIG. 3) may therefore search to locate a particular subchannel that provides the highest quality transmission signal, and then transparently switch to the corresponding auxiliary base station 410 for optimal wireless transmission.

In the FIG. 4 embodiment, a system user may store handheld TV 158 on auxiliary base station 410 by connecting handheld TV 158 to remote TV connection 412. Further more, AC/DC converter 418 may provide operating power to RF repeater 414, and may also recharge batteries in handheld TV 158 through remote TV connection 412.

Figure 5:
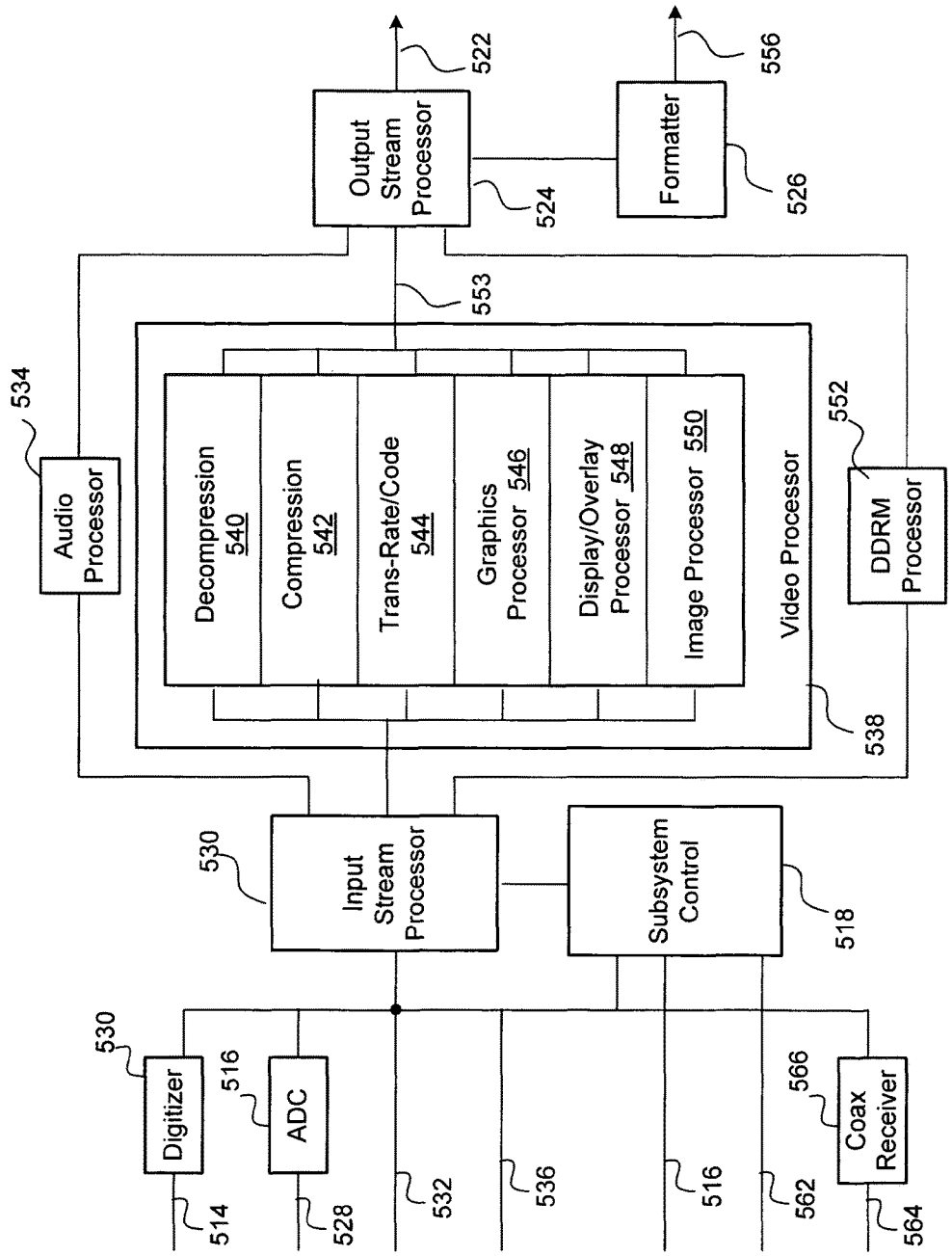
FIG. 5 is a block diagram of a media input system from the digital base station of FIG. 1, in accordance with one embodiment of present invention.

Referring now to FIG. 5, a media input subsystem 512 from the FIG. 1 digital base station 156 is shown, in accordance with one embodiment of present invention. In the FIG. 5 embodiment, digital base station 156 includes, but is not limited to, one or more media input subsystems 512. In the FIG. 5 embodiment, media input subsystem 512 receives various input signals that may include analog video on path 514, analog audio on path 528, uncompressed digital audio/video (AN) data on path 532, and compressed digital audio/video (CDAV) 536. In alternate embodiments, media input subsystem 512 may receive any other types of appropriate and compatible input signals including various control signals 516. The control signals 516 are utilized by the subsystem control 518 to control each of the various processing steps of media input subsystem 512 (connections to subsystem control not shown). Additional connections are available over Universal Serial Bus (USB) 562.

In accordance with the present invention, media input subsystem control 518 receives various types of information from program sources 112 (FIG. 1) that may be encoded using an extensive variety of formats and configurations. Media input subsystem control 518 then processes and manipulates the received program sources 112 to advantageously generate processed program information in a particular format that is compatible for downstream transmission by a communications processor 636 (FIG. 6) for display at one of the various FIG. 1 televisions 150, 152, 158, remote video appliance 166, or at the remote personal computing station 168.

In the case of analog video information, digitizer 530 converts the analog video into digital video that is relayed to the input stream processor 530. In the case of analog audio information, analog-to-digital converter (ADC) 516 converts analog audio on path 528 into digital audio that audio processor 534 then receives via input stream processor 530. In one embodiment of the present invention, audio processor 534 includes conversions to and from various MPEG and PCM (pulse code modulation) techniques and processes. Following the foregoing audio signal processing procedures, audio processor 534 provides the processed audio to output stream processor 524.

Input stream processor 530 receives the digitized video from digitizer 530, digitized audio from the audio Analog-to-Digital Converter (ADC) 516, digital audio and video on path 532, and compressed digital audio and video on path 536. Examples of uncompressed digital video on path 532 are HDMI, DVI, DVO and SDVO. Standards suitable for compressed video data on path 536 may include 1394A, 1394B, 1394C, or other similar buses. USB 562 is another bus that may carry compressed audio and video data. Each of the inputs may include information in addition to the audio and video information (such as various supplemental data and additional stream information). One of the functions of input stream processor 530 is to separate the audio, video, and data portions of the various inputs, and then send the audio information to the audio processor 534, send the video information to the video processor 538, and add supplemental data and digital rights management (DRM) information to the Data and Digital Rights Management (DDRM) processor 552. Input stream processor 530 also receives information from the subsystem control 518 which may include various controls related to the three types of processing that may also require additional processing steps. For example, subsystem control 518 may indicate to the input stream processor 530 the different types of window management and display functions that are then provided as part of the video processor 538.

Video processor 538 performs many functions relating to processing of the input video stream. These functions may be performed in a variety of ways including methods of a digital signal processor, a media processor, a general purpose processor, a graphics processor, fixed function processing blocks, or any combination of the foregoing. In addition to the processing blocks, various memory stores are required, either separate or in aggregate to the various processing blocks. The units shown in FIG. 5 are functional descriptions of some of the various types of functions that are possible, but not required, in one version of video processor 538.

Various compression and decompression (CODEC) methods and standards exist for video that may be lossless or lossy. Discrete Cosign Transform (DCT) based CODECs include MPEG, MPEG-2, H.323, MPEG-4, WM9, VC1, AVC, AVS and other similar standards. Wavelet transforms are another type of CODEC, and JPEG2000 is an example of a wavelet based CODEC. Various forms of each CODEC may be either spatial, where the compression occurs within a frame of video, or temporal, where compression occurs between frames (also referred to as 3D processing where the third dimension is time). DCT based CODECs typically operate on a group of pictures (GOP), but also operate on a single index frame (I-Frame). DCT based CODECs typically operate on a fixed size block of pixels, whereas wavelet based CODECs can operate on more flexible basis. There are numerous trade-offs of computational complexity, latency, compression ratio, video quality, memory requirements and compatibility issues based on the CODEC architecture. Other CODECs based on run length encoding (RLE), Huffman Codes, Vector Quantization (VQ), JPEG and Motion JPEG can be utilized by the system.

In addition to supporting various standard implementations of the different CODECs, because system 110 relates to video and displays, it is useful, where possible, for the wavelet based CODECs to operate on a scan line or groups of scan lines basis rather than on an entire frame. By operating on a scan line, or group of scan lines, the wavelet CODEC can start transmission of the first portion of the video frame while additional portions of the video frame are still being compressed. Whereas DCT based CODECs often use a more complex method of temporal compression in which the decompression utilizes information from prior and future frames of video, it is better for a low latency 3D wavelet encoder to only use display information from prior frames of video that are already available to the decoder when operating on a current frame of video. By using such a 3D wavelet encoder, groups of scan lines that have changed can be compressed as they pass through the encoder. When scan lines, or groups of scan lines have not changed, the encoder can indicate to the decoder to use the data from the prior frame. Other precinct based methods that do not require a full frame can be used where a precinct is defined as a group of blocks that can be compressed without causing edge artifacts where the precincts are joined.

The wavelet based transform has additional properties that are useful for system 110. For example, one type of wavelet transforms decomposes each frame into several subbands which are versions of the frame in which the image of the frame is filtered and scaled to a different size. This pyramidal scheme of having different resolutions of the same image is used by system 110 for optimizing the subband coding along with information about the transmission channel and the target display characteristics. Additional discussion of the foregoing techniques are discussed below in conjunction with FIG. 7.

The decompression 540 function is used to decompress video inputs that are received from one of the program sources 112. By decompressing the video, the video is converted into the spatial domain so that each frame of video can be operated on more easily. The decompression unit 540 is typically able to operate on the types of video compression used by the various program sources 112, and may include MPEG-2, MPEG-4, VC1, H.264, DIVX, or another type of video.

The compression 542 function is used to compress otherwise uncompressed video into a video format for use by the output stream processor 524. The formats supported by the compression 542 function are those useful to multi-room TV system 110. Compression formats supported may include MPEG-2, MPEG-4, VC1, H.264, VQ, wavelet transform, 3D wavelet transform, or another type of video compression. Wavelet transform coding may be closely related to subband coding and the associative filter design. As such, the wavelet transform can include a multi-resolution decomposition in a pyramidal scheme. It is also possible to compress the different subbands using different coding techniques.

The trans-rate and trans-code 544 function (trans rate/code) is used to convert the bit rate within a given video compression format, or to translate the video compression format used from one of the input compression formats to one of the output compression formats without necessarily requiring a full decode and encode. It is sometimes advantageous to avoid a full decode and encode because that may require more processing power or may result in lower quality video. The formats for trans-coding may include those listed above with respect to the compression function 542. The trans-rate function to change the bit rate within a compression format is useful for matching the bit rate to the subsequent downstream network interface that is discussed below.

The image processor 550 function performs various image manipulations on the input video stream. Such operations may include video format and frame rate conversion in order to optimize the format and display rate for the system. Image processor 550, for example, may modify the resolution of a 720 Progressive High Definition input video, and convert it to 480 progressive for a display device that is not capable of supporting full 720 progressive. Another function may include other image enhancement operations.

The graphics processor 546 function is used to perform graphics user interface drawing and produce the on-screen display graphics for such functions as providing on-screen program guides. The graphics processor 546 functions may include 2D graphics operations, 3D graphics operations, and special graphics operations performed on the video data. In one example, the graphics processor 546 produces an overlay of program guide information. Such an overlay is then combined with the video frames by the display/overlay processor 548 to produce a frame of combined graphics and video. In combining the graphics and video, the display/overlay processor 548 may perform functions such as alpha blending, scaling the video into a window, color/chroma keying of the video onto the graphics or the graphics onto the video, or any other number of functions to combine graphics and video data.

As discussed above, the digital base station 156 (FIG. 1) may include more than one media input subsystem 512. In some cases, the display/overlay processor 548 may perform the function of combining graphics and video for video streams processed by other media input subsystems 512. Various combinations of picture-in-picture and other combinations of more than one simultaneous video may thus be supported. Additional functions such as wipes and fades between multiple videos and between video and graphics may also be performed to improve the overall capability of the system.

As an example of the overall function of video processor 538, the compressed format of a program source 112 may be optimized for service provider network transmission, and may not be the type of compression format that is most useful in the local multi-room system 110. A satellite broadcast may utilize H.264 video compression format because it provides a very low bandwidth solution and a high definition video signal can be transmitted in less then 10 million bits per second. For multi-room TV system 110, the local network bandwidth may be substantially higher than the 10 million bits per second. Additionally, the digital base station 156 may require that graphical data be visually combined with the network's broadcast video stream, where the control of the graphics data is being performed from a television display 152 that is not in the same room as the digital base station 156. For such an example, the input video stream may be processed by decompression 540 function, then the decompressed video may be combined with the output of the graphics processor 546, and the display/overlay processor 548 may perform the final compositing of each frame. Each composite frame may then be processed by the compression 542 function by performing a wavelet transform. Though the wavelet transformed video data may be on the order of 100 million bits per second, the user of television 152 experiences very responsive controls for navigation of the graphical display and control of the video because the wavelet transforms, or the 3D wavelet transform, has very low latency.

Data and Digital Rights Management (DDRM) processor 552 performs various functions, including performing appropriate Digital Rights Management (DRM) so that protected premium programming provided by a service provider can be securely used within the home environment with one or more of the TVs. Authentication for the service provider may include smart cards or other methods of key based encryption systems. The DDRM processor 552 may include the ability to generate keys for when key exchange is used as part of the security protocol. The DDRM processor 552 may also follow the requirements specified in the Digital Living Network Alliance (DLNA) specification. Other data operations may include processing auxiliary data information that was included with the program source 112.

Different interfaces may have different variations of DRM schemes associated with them. Broadcast TV may include flags that indicate whether a program can be copied. HDMI may include the high definition copy protection (HDCP) protocol to indicate the access rights for high definition content. The 1394 bus may include DTCP as the protection protocol. DDRM processor 552 is responsible for preserving the intended protections of the input scheme while still allowing the content to be distributed over one of the network interfaces or output via the formatter 526 and path 556 to a television device.

Output stream processor 524 performs the reassembly of the audio, video and data to produce an output stream that is to be used by the communications processor 636 (FIG. 6) via path 522. The processed video can also be formatted by the display formatter 526, and output over a wired bus 556 suitable for direct connection to a television input.

The path 553 between the output stream processor 524 and the video processor 538 is a two-way path. Videoprocessor 538 may thus receive information from the downstream communications processor 636 (FIG. 6) as well as the RF XMIT/RCVR 640. By understanding the type of communication channel that will be used by system 110 to transmit video information, the parameters of the video encoding may be adjusted accordingly. The foregoing techniques are further discussed below in conjunction with FIGS. 7 and 8.

Figure 6:
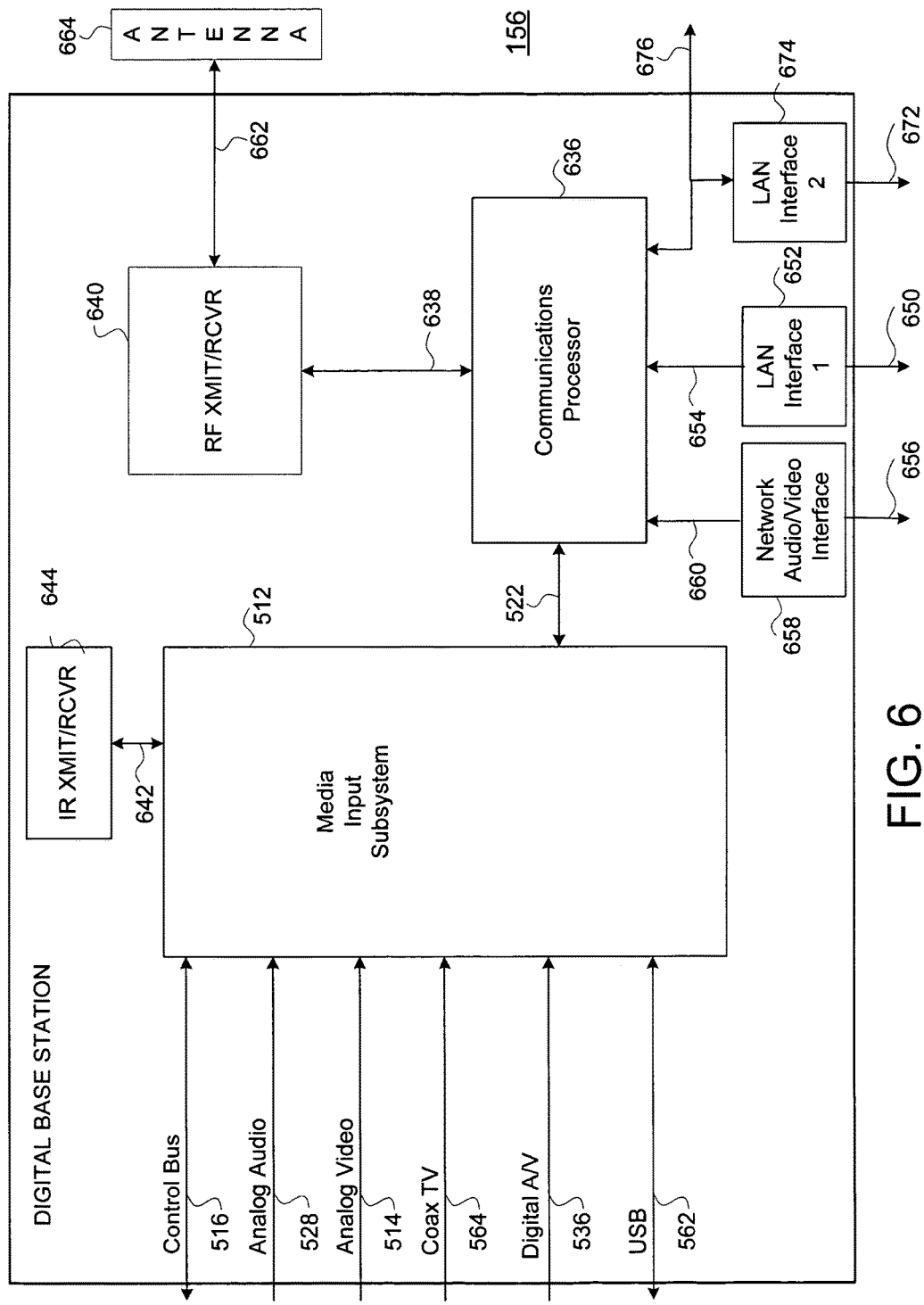
FIG. 6 is a block diagram of an exemplary digital base station, in accordance with one embodiment of present invention.

Referring now to FIG. 6, a block diagram of an exemplary digital base station 156 includes, but is not limited to, a media input subsystem 512, an infrared transmitter/receiver (IR XMIT/RCVR) 644, one or more local-area network (LAN) interfaces 652 and 674, a communications processor 636, a RF transmit and receive subsystem 640, an antenna 664, and a network audio/video interface 656. In alternate embodiments, digital base station 156 may be implemented to include various components that are different from, or in addition to, certain of those discussed in conjunction with the FIG. 6 embodiment.

In the FIG. 6 embodiment, media input subsystem 512 may receive various selectable program signals from any appropriate source, including program sources 112 (FIG. 1). Media input subsystem 512 then responsively processes and manipulates the received program signals to generate a processed output stream on path 522, to be used by the communications processor 636. In response, communications processor 636 performs a network processing procedure on the processed stream to generate a transmitter-ready stream to radio-frequency transmitter/receiver (RF XMIT/RCVR) 640 via path 638. Communications processor 636 performs the foregoing network processing procedure in response to relevant characteristics of multi-room television system 110. For example, the network processing procedure may depend on various factors such as the particular wireless transmission techniques utilized for effective wireless transmission, or the type of bus arbitration required for the various LAN or Network Audio/Video interfaces.

In the FIG. 6 embodiment, RF XMIT/RCVR 640 may then manipulate (for example, up-convert and modulate) the transmitter-ready stream to advantageously generate and transmit a local composite stream through path 662 and antenna 664 to remote TV 158, remote controller 310, auxiliary base station 410, or other appropriate devices, in accordance with the present invention. In the FIG. 6 embodiment, RF XMIT/RCVR 640 may be implemented to include any desired types of effective up-conversion, modulation, or other wireless transmission techniques, including a variety of wireless standards that may be supported including 802.11a, 802.11b, 802.11g, 802.11n, or one of the UWB standards. When using UWB, 1394 and USB protocols can be supported wirelessly with the Wireless 1394 and Wireless USB industry efforts.

In the FIG. 6 embodiment, digital base station 156 may communicate with various wide-area networks (such as the Internet) via LAN interface 652. For example, media input subsystem 512 may access digital AN data from the Internet via path 650, LAN interface 652, path 654, communications processor 636, and path 522. Media input subsystem 512 may then process the Internet AN data, and subsequently provide the processed Internet AN data through path 522 to communications processor 636 for wireless transmission by RF XMIT/RCVR 640, as discussed above. Similarly, Media input subsystem 512 may process on of the program sources 112 and perform a type of compression for distribution of the processed stream over the internet to a distant client.

In accordance with the present invention, communications processor 636 may also provide the transmitter-ready stream to RF repeater 414 in auxiliary base station 410 via path 654, LAN interface 652, and path 650, as discussed above in conjunction with FIG. 4. In some systems (for example a MoCA based system), the LAN connection 650 may be physically the same as the coax TV interface 564. In another system, such as a home network using standard phone line or power lines, a second LAN connection 672 may be controlled by LAN interface 674. In another embodiment, LAN interface 674 may control multiple physical interfaces (not shown) such as Ethernet over CAT5 UTP cable, Ethernet over Power Line, Ethernet over phone line and Ethernet over Coax.

Communications processor 636 may also control a network audio/video interface 658 which may connect to a variety of physical connections 656 such as CAT5 cable or enhanced versions of UTP cable such as CAT5e or CAT6. Additional physical connections may use COAX cable, 1394 cable, or HDMI cable. In one example, network audio/video interface 658 supports modulating MPEG-2 data onto a COAX cable at connection 656 where the modulation is compatible with the ATSC standard for HDTVtransmission. Such an implementation would allow any standard HDTV to receive and decode such a transmission.

In another example, the network audio/video interface 658 is designed to operate with streaming data, and may be less data-oriented than typical Ethernet based standards. One such example is 1394C which uses 1394 protocol over CAT5 wiring. Other efforts to run protocols similar to DVI and HDMI over UTP cable and over coax cable may also be supported. Another implementation can use the UDP transport scheme of Ethernet and include a light method of handshaking the packet transmissions and fast management as to which, if any, packets need to be retransmitted in case of error. This has the benefits of a TCP/IP approach without the overhead of the full TCP/IP protocol and can be applied to wired or wireless IP networks.

In the FIG. 6 embodiment, handheld TV 158 or remote controller 310 may advantageously transmit wireless radio-frequency control information to media input subsystem processor 512 through antenna 664, RF XMIT/RCVR 640, and communications processor 636. In response, media input subsystem 512 may function as a master controller to utilize the received wireless radio-frequency control information for controlling various components and functionalities in multi-room television system 110. Media input subsystem 512 may use the received RF control information in any suitable manner. For example, media input subsystem 512 may control appropriate system components either by hard-wired connections, by utilizing control bus 516, or by transmitting the control information through path 642 and infrared transmitter/receiver (IR XMIT/RCVR) 644. In an additional mode, media input subsystem 512 may control various other components in system 110 via communications processor 636 and the LAN interface 652 where other devices on the LAN 650 conform to the Universal Plug and Play (UPnP) protocol.

In accordance with the present invention, media input subsystem 512 may also utilize IR XMIT/RCVR 644 and RF XMIT/RCVR 640 to monitor all remotely-generated system control signals. Media input subsystem 512 may then responsively maintain corresponding system component status information to facilitate intelligent system control interaction in multi-room television system 110. For example, a system user in a viewing location that is remote from program sources 112 may wish to view the program guide information on remote TV 152 from a satellite service provider. Media input subsystem 512 may generate the appropriate signals to the program source to make available the program guide information, and may then transmit the program guide information in the desired format, either alone or combined with the video program source, to the remote TV 152. In another embodiment, an IR input 246 may be implemented as part of remote TV 152. The IR commands are translated by the other interface 220 controls and sent to the media input subsystem processor 512 via the LAN 242, RF 240, or another connection.

In accordance with the present invention, media input subsystem 512 may also communicate with compatible components throughout multi-room television system 110 using a control bus 516. In the FIG. 6 embodiment, control bus 516 may be implemented using any compatible configuration and/or protocol. For example, control bus 516 may be effectively implemented in accordance with a control bus standard, and may also utilize various signaling protocols and techniques in compliance with Digital Living Network Alliance (DLNA) or Home Audio-Video Home Interoperability (HAVI) standard.

Figure 7:
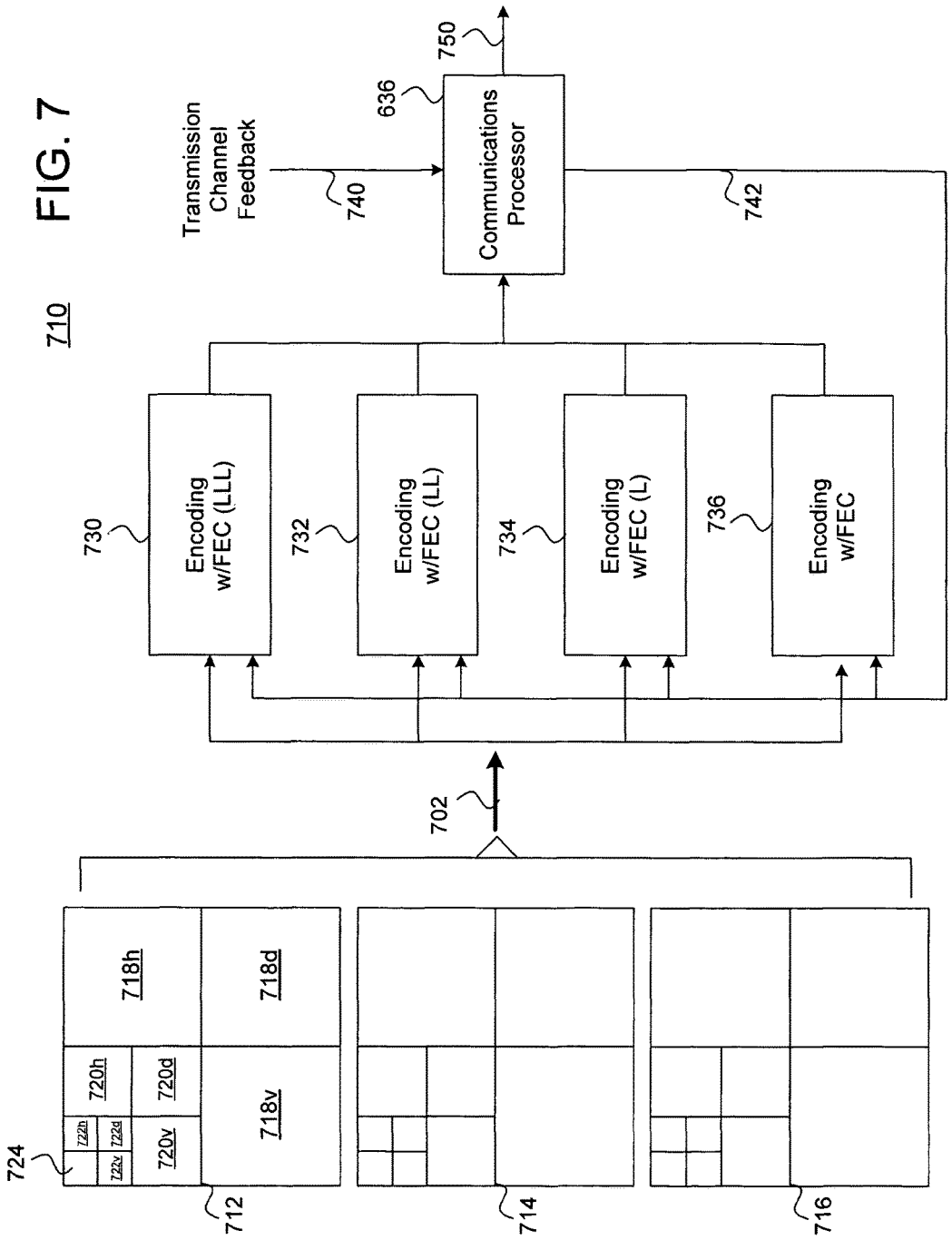
FIG. 7 is a dataflow diagram illustrating how subband-encoded video proceeds through certain processing steps, in accordance with one embodiment of present invention.

Referring now to FIG. 7, a dataflow diagram illustrating a process 710 for converting from a frame of video through to the FIG. 6 communication processor 636 is shown. The first step is for each component of the video data to be decomposed via subband encoding into a multi-resolution representation. A quad-tree-type decomposition for the luminance component Y is shown in block 712, for the first chrominance component U in 714, and for the second chrominance component V in 716. The quad-tree-type decomposition splits each component into four subbands, where the first subband is represented by 718*h*, 718*d*, and 718*v*, with the foregoing "h", "d" and "v" respectively denoting "horizontal", "diagonal", and "vertical". The second subband, which is one half the resolution of the first subband in both the horizontal and vertical direction, is represented by 720*h*, 720*d*, and 720*v*. The third subband is represented by 722*h*, 722*d*, and 722*v*, and the fourth subband is represented by box 724.

Forward Error Correction (FEC) is one exemplary method for improving the error resilience of the transmitted bitstream. FEC includes the process of adding additional redundant bits of information to the base bits, so that if some of the bits are lost or corrupted, a complete or nearly complete representation of the frame can be reconstructed by the decoder system. The more bits of redundant information that are added during the FEC step, the more strongly protected and the more resilient to errors the bit stream becomes. In the case of wavelet encoded video, the lowest resolution subbands of the video frame may have the most image energy, and may be protected with more FEC redundancy bits than the higher resolution subbands of the frame.

The different subbands for each component are passed to the encoding step via path 702. The encoding step is performed for each subband by encoding with FEC performed on the first subband 736, on the second subband 734, on the third subband 732, and on the fourth subband 730. Depending on the type of encoding performed, there are various other steps applied to the data prior to, or as part of, the encoding process. These steps may include filtering or differencing between the subbands. Encoding the differences between the subbands is one of the steps of a type of compression. For typical images, most of the image energy resides in the lower resolution representations of the image. The other bands contain higher frequency detail that is used to enhance the quality of the image. The encoding steps for each of the subbands uses a method and bitrate most suitable for the amount of visual detail that is contained in that subimage.

There are also other scalable coding techniques that may be used to transmit the various image subbands across different communication channels in which the communication channels have different transmission characteristics. This technique may be used to match higher priority source subbands with the higher quality transmission channels. This source based coding may be used where the base video layer is transmitted in a heavily protected manner and the upper layers are protected less or not at all. This technique can lead to good overall performance for error concealment and will allow for graceful degradation of the image quality. Another technique of error resilient entropy coding (EREC) may also be used for high resilience to transmission errors.

In addition to dependence on subimage visual detail, the type of encoding and the strength of the FEC is dependent on transmission channel error characteristics. Transmission channel feedback 740 is fed to the communications processor 744 which then feeds back the information to each of the subband encoding blocks via path 742. Each of the subband encoders transmits the encoded subimage information to the communications processor 744. Communications processor 744 then transmits the compressed streams to the target transmission subsystem via path 750.

As an extension to the described 2-D subband coding, 3-D subband coding may also be used. For 3-D subband coding, the subsampled component video signals are decomposed into video components ranging from low spatial and temporal resolution components to components with higher frequency details. These components are encoded independently using a method appropriate for preserving the image energy contained in each of the components. The compression is also performed independently through quantizing the various components and entropy coding of the quantized values. The decoding step is able to reconstruct the appropriate video image by recovering and combining the various image components. The psycho-visual properties of the video image are preserved through encoding and decoding of the video. Advanced 3D methods such as applying more sophisticated motion coding techniques, image synthesis, or object based coding are also methods to improve the image quality for a given bitrate or reduce the bitrate for a given quality.

Additional optimizations with respect to the transmission protocol are also possible. For example, in one type of system, there can be packets that are retransmitted if errors occur, and there may be packets that are not retransmitted regardless of errors. There are also various threshold-of-error rates that may be set to determine whether packets need to be resent. By managing the FEC allocation, along with the packet transmission protocol with respect to the different subbands of the frame, the transmission process may be optimized to assure that the decoded video has the highest possible quality. For example, an Ethernet network could use various forms of UDP, UDP with handshaking and TCP/IP transmissions to assure that the packets are appropriately prioritized and only retransmitted if it is necessary. Some transmission protocols have additional channel coding that may be managed independently or combined with the encoding steps.

System level optimizations that specifically combine subband encoding with the UWB protocol are also possible. In one embodiment, the subband with the most image energy utilizes the higher priority hard reservation scheme for the medium access control (MAC) protocol. Additionally, the low order band groups of the UWB spectrum that typically have higher range may be used for the higher image energy subbands. In this case, even if a portable TV were out of range of the UWB high order band groups, the receiver would still receive the UWB low order band groups and would be able to display a moderate or low resolution representation of the original video.

Figure 8:
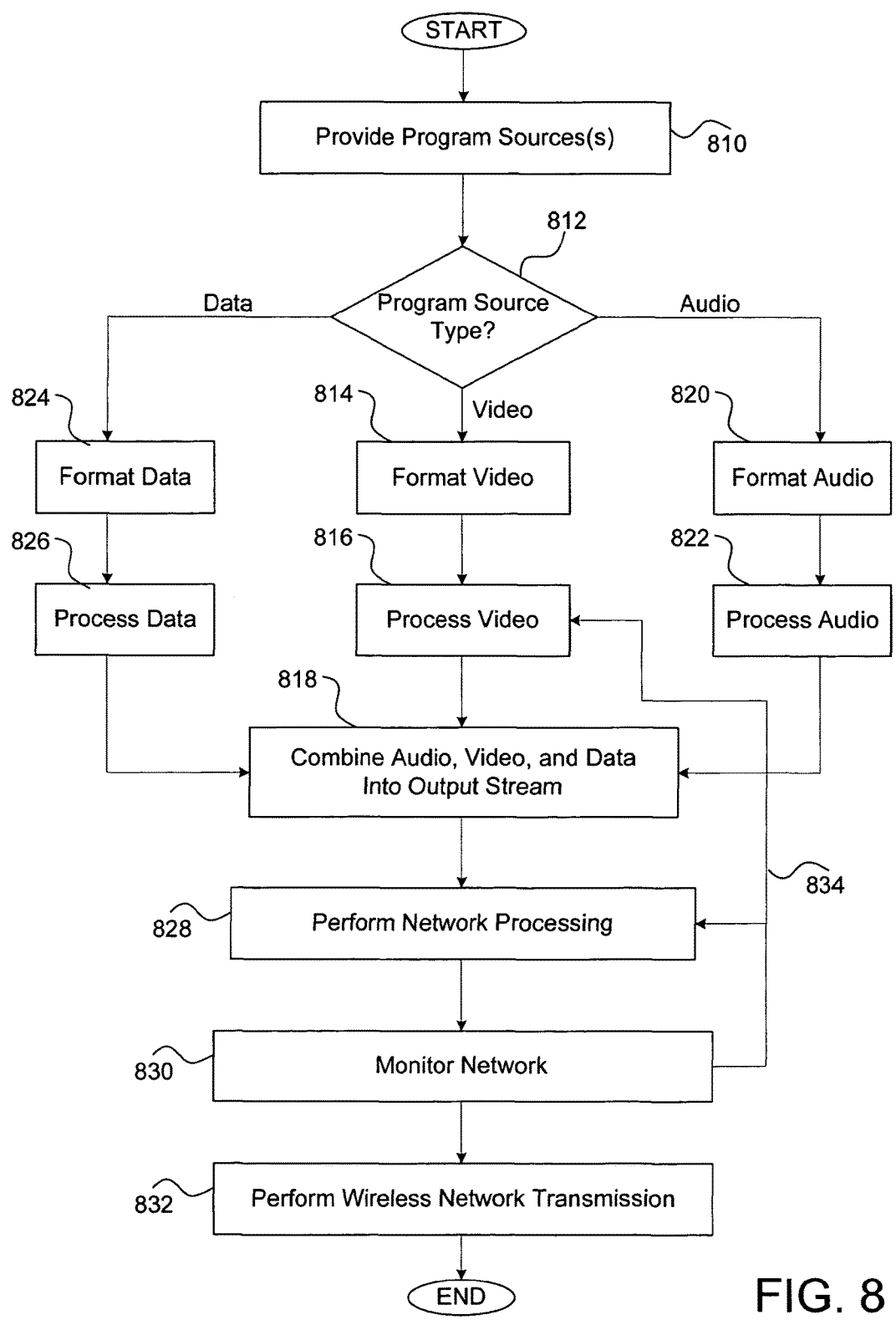
FIG. 8 is a flowchart of method steps for performing a local compositing and transmission procedure, in accordance with one embodiment of present invention.

Referring now to FIG. 8, a flowchart of method steps for performing a multi-room transmission procedure is shown, in accordance with one embodiment of present invention. In the FIG. 8 embodiment, in step 810, multi-room television system 110 initially provides one or more program sources 112 to digital base station 156. In step 812, input stream processor 530 differentiates various types of program sources 112 depending on whether the program source(s) 112 include any combination of data, video, or audio information. The FIG. 8 flow chart does not specifically recite the conversion of analog inputs to digital, though another embodiment may include those steps.

If a program source 112 includes data, then, in step 824, DDRM processor 552 formats, and in step 826, processes the digital data into an appropriate format. This data processing may relate to program guide information, or may relate to a DRM scheme used by the broadcast. If a program source 112 includes audio data, then in step 820, the audio data is formatted, and in step 822, the audio data is processed by the audio processor 534.

If a program source 112 includes video, then in step 814, the video processor 538 appropriately formats the video, and then processes the video in step 816. The format video step 814 and process video step 816 may include various combinations of decompression, compression, trans-coding, trans-rating, and image processing. The video frames may then be combined either with data from step 826, or with data generated within step 814 and step 816, to generate an output video stream that may also include graphics information and may be processed by the display/overlay processor 548 prior to the compression. Step 818 further combines the data, video and audio into a combined output stream via the output stream processor 524. Step 828 performs network processing via communications processor 636.

In step 830, multi-room TV system 110 monitors network transmissions prior to providing the output stream to step 832 for the final network transmission function to one of the output paths. The monitoring network step 830 may also be used to feedback network information to step 816 for the processing of the video, and to step 828 for performing the network processing. This feedback via path 834 is useful for adapting the type of video processing performed by video processor 538 to best match the video output stream to the characteristics of the transmission channel. One such example of adapting video encoding to the transmission channel is the multi-band wavelet encoding described above in conjunction with FIG. 7. In addition, communications processor 636 may use the transmission channel information from network monitor step 830 to modify the type of transmission process performed on the data.

Figure 9:
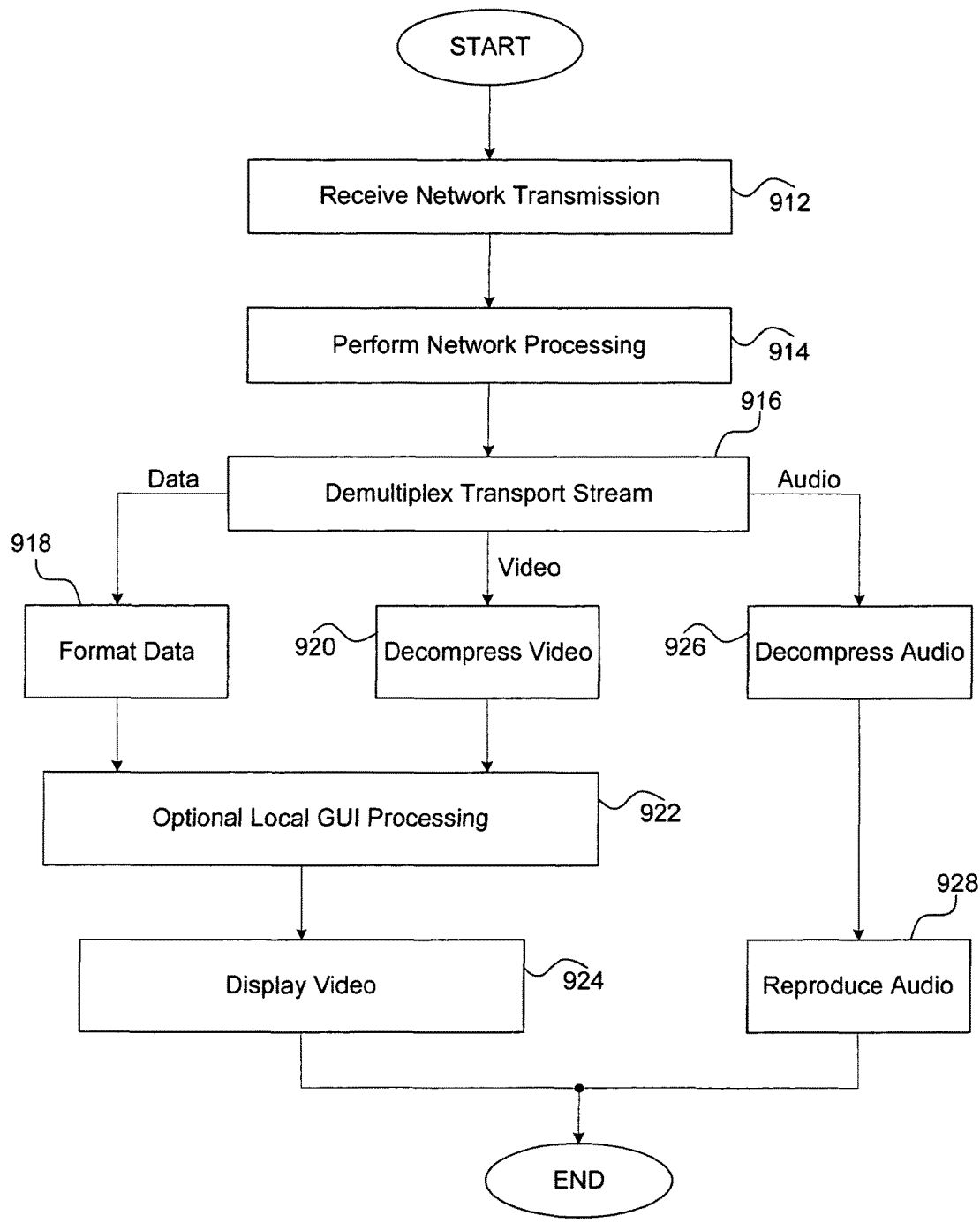
FIG. 9 is a flowchart of method steps for performing a local reception procedure for a remote TV, in accordance with one embodiment of present invention.

Referring now to FIG. 9, a flowchart of method steps for performing a network reception procedure is shown, in accordance with one embodiment of present invention. For reasons of clarity, the FIG. 2 network reception procedure is discussed in reference to remote TV 158 which receives the data via wireless networking. However, network reception over a wired network to remote TV 152, remote controller 310, auxiliary base station 410, or any other compatible receiver device is equally contemplated for use in conjunction with the present invention.

In the FIG. 9 embodiment, initially, in step 912, remote TV 158 receives a local composite stream from digital base station 156. Then in step 914, RF receiver 214 performs a wireless network processing procedure to generate a baseband stream or one of the other inputs of FIG. 2 receives a network transmission. The foregoing wireless network processing procedure may include various appropriate techniques, such as demodulation and down-conversion of the local composite stream propagated from digital base station 156. The other network inputs processing blocks, including Coax Receiver 216 and LAN Processor 218 perform the appropriate network reception.

In step 916, remote TV 158 receives and demultiplexes the baseband stream into separate components which may include separate data, video, and audio information. If the baseband stream includes data information, then in step 918, demux with audio and data decoder 256 manipulates the data information into an appropriate format to generate manipulated data, and the FIG. 9 process advances to step 922. Similarly, if the baseband stream includes video information, then in step 920, advanced decoder 254 decompresses the video information to generate decompressed video, and the FIG. 9 process advances to step 922.

In addition, if the baseband stream includes audio information, then in step 926, demux with audio and data decoder 256 first decompresses the audio information to generate decompressed audio, which is then used in step 928 to reproduce the audio output.

In step 922, display processor 224 may access the manipulated data (step 918) and the decompressed video (step 920), and may perform an optional local graphical user interface (GUI) processing procedure to generate display data and display video for presentation on remote TV 158. An example of optional local GUI processing is using an on-screen display for the volume, tint, or other setup functions that apply specifically to local remote TV 158, and not to the program source 112. Finally, in step 924, display processor 224 provides the display data and the display video to remote TV screen 212 for viewing by a user of the multi-room television system 110.

In one embodiment, an important distinction of local GUI functions and program source related functions is made. The user of the multi-room television system 110 affects the user interface on TV screen 212 by control of the graphics processor 546 which is part of the media input subsystem processor 512. In the case of program source 112 selection and performing on-screen display navigation, the graphics processor 546 and the display/overlay processor 548 combine the video and on-screen display information prior to the compression 542 function. In this method, the network stream that is produced and transmitted in step 832 already includes display-ready video, so when advanced decoder 254 performs the decompress video step 920, the display information is already ready for the display processor 224 without the need for the local step 922 of performing GUI processing. Local GUI processing in step 922 is performed local to the display device by display processor 224, not by the media input subsystem processor 512.

The present invention therefore implements a flexible multi-room television system that a user may effectively utilize in a wide variety of applications. For example, a video camera device may generate a wireless transmission to remote TV 158 for purposes such as surveillance and monitoring, or the transmission may be received by digital base station 156, and the transmission stored on a connected storage device In addition, a viewer may flexibly utilize multi-room television system 110 for displaying information from a home computer (such as viewing a personal recipe collection while cooking), for displaying various user profiles (such as a particular viewer's favorite television channels), or for sequencing through images in a "picture frame" mode when remote TV 158 is not otherwise in use. Therefore, the present invention effectively implements a flexible multi-room television system 110 that utilizes various heterogeneous components to facilitate optimal system interoperability and functionality. In addition, a user over the Internet may control program selection and view any of the program sources while controlling the digital base station from a remote location, thus extending the system from multi-room to multi-location.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus that provides an output stream to a display device over a network comprising a radio frequency (RF) transmission channel, the apparatus comprising:

an input configured to receive video information comprising television programming from a program source, wherein the video information is selected responsive to control information received from the display device via the network that identifies the selected video information based upon an input received from a viewer at the display device;
a processing unit configured to encode the selected video information to create a processed stream as the selected video information is received, wherein the processed stream comprises video frames of the selected video information that are encoded for transmission on a plurality of subbands of the RF transmission channel each representing a different resolution of the video frame and each having an error resiliency, and wherein the processing unit is further configured to receive network feedback information comprising information about a characteristic of the RF transmission channel, and to adapt the error resiliencies for the plurality of subbands as the selected video information is received based on the characteristic of the RF transmission channel described in the network feedback information so that the subband representing the lowest resolution of the video frame is more error resilient and higher quality than the subband representing the highest resolution of the video information frame;
a communications unit configured to manipulate the processed stream to produce an output stream; and
a wireless transmitter configured to transmit the output stream to the display device via the network.

2. The apparatus of claim 1 wherein said error resiliency is adapted by changing a number of forward error correcting (FEC) bits.

3. The apparatus of claim 1 wherein each of said subbands comprises wavelet transforms of said video information.

4. The apparatus of claim 1 wherein said transmitter utilizes an IEEE 802.11 protocol.

5. The apparatus of claim 1 wherein said processed stream follows conventions of 3D wavelet transform data.

6. The apparatus of claim 1 wherein each of the plurality of subbands is simultaneously transmitted to the display device on the wireless network using a plurality of channels each having a different transmission quality, and wherein the error resiliency of each subband is adapted by matching the subbands having lower resolutions to the channels having higher transmission qualities.

7. A method comprising the steps of:
receiving control information from a display device via a wireless network having at least one radio frequency (RF) transmission channel, wherein the control information identifies video information selected by a viewer for presentation on the display device;
responsive to the control information, receiving the video information selected by the viewer from a program source that provides television programming;
encoding the video information selected by the viewer as the selected video information is received to create a processed stream representing video frames of the video information for transmission on a plurality of subbands of the RF transmission channel, each subband representing a different video resolution of the video frame and having an error resiliency;
adjusting the encoding of the selected video information as the selected video information is received based on information about the RF transmission channel to adjust the error resiliencies of the plurality of subbands so that the subband representing the lowest video resolution of the video frame is more error resilient and higher quality than the subband representing the highest video resolution of the video frame;

processing the processed stream to generate a transmitter-ready stream; and
transmitting the transmitter-ready stream via the network.

8. The method of claim 7 further comprising monitoring channel error characteristics of an RF transmission channel to thereby generate the information about the wireless network.

9. The method of claim 8 wherein the adjusting comprises adjusting the error resiliency for at least one of the subband encodings based upon the monitored channel error characteristics of the wireless network.

10. The method of claim 8 wherein the processed video stream comprises a wavelet-encoded video stream in which the plurality of subbands of video have unequal error resilience.

11. The method of claim 10 wherein each of said subbands comprises wavelet transforms of said video information.

12. The method of claim 10 wherein said error resilience of at least one of the subbands is adjusted by changing a number of forward error correcting (FEC) bits.

13. The method of claim 10 wherein the subbands are transmitted on the wireless network using a plurality of channels, and wherein the unequal error resiliences are adapted by matching the subbands having the lower resolutions to the channels having higher transmission qualities.

14. The method of claim 7 wherein signals are combined from two or more program sources to produce the processed video stream as a combined video stream.

15. The method of claim 7 further comprising converting the video information from an analog format to a digital format.

16. A base station configured to process program information selected by a viewer of a display system communicating with the base station over a network comprising a radio frequency (RF) transmission channel, the base station comprising:
processing circuitry configured to receive the selected program information, to receive network feedback information describing characteristics of the RF transmission channel, to encode the selected program information as the selected program information is received to generate a processed stream representing video frames of the program information with different video resolutions for transmission on a plurality of subbands of the RF transmission channel each having an error resiliency, to adapt the encoding of the selected program information as the selected program information is received to thereby adjust the error resiliencies of the subbands based on the characteristics of the RF transmission channel described in the network feedback information so that the subband representing the lowest video resolution of the video frame is more error resilient and higher quality than the subband representing the highest video resolution of the video frame, and to manipulate the processed stream to produce the output stream for transmission; and
a network interface configured to transmit the output stream over the network to the display system.

17. The base station of claim 16 wherein the subband encodings each comprise a wavelet transform of said video frame.

18. The base station of claim 16 wherein the encoding is adapted by changing a number of forward error correcting (FEC) bits in at least one of said subband encodings based upon the characteristics of the RF transmission channel.

19. The base station of claim 16 wherein each of the subband encodings is transmitted on the wireless network using a separate one of a plurality of channels, and wherein the encoding of the processed stream is adapted by matching the subbands having the lowest video resolution to the channels having higher transmission qualities.

* * * * *